(12) United States Patent
Yudanov et al.

(10) Patent No.: US 12,468,545 B2
(45) Date of Patent: *Nov. 11, 2025

(54) INITIAL DATA DISTRIBUTION FOR DIFFERENT APPLICATION PROCESSES

(71) Applicant: Micron Technology, Inc., Boise, ID (US)

(72) Inventors: Dmitri Yudanov, Rancho Cordova, CA (US); Samuel E. Bradshaw, Sacramento, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/967,721

(22) Filed: Oct. 17, 2022

(65) Prior Publication Data

US 2023/0039910 A1 Feb. 9, 2023

Related U.S. Application Data

(63) Continuation of application No. 16/592,547, filed on Oct. 3, 2019, now Pat. No. 11,474,828.

(51) Int. Cl.
*G06F 9/44* (2018.01)
*G06F 9/4401* (2018.01)
(Continued)

(52) U.S. Cl.
CPC ........ *G06F 9/4406* (2013.01); *G06F 9/44505* (2013.01); *G06F 12/0638* (2013.01);
(Continued)

(58) Field of Classification Search
None
See application file for complete search history.

(56) References Cited

U.S. PATENT DOCUMENTS

| 4,476,524 A | 10/1984 | Brown et al. |
| 5,218,677 A | 6/1993 | Bono et al. |

(Continued)

FOREIGN PATENT DOCUMENTS

| CN | 108288178 | 7/2018 |
| WO | 2019171237 | 9/2019 |

OTHER PUBLICATIONS

Application Runtime Environment.*
(Continued)

*Primary Examiner* — Fahmida Rahman
(74) *Attorney, Agent, or Firm* — Greenberg Traurig

(57) ABSTRACT

In a mobile device, processes of an application can be monitored and scored for initial data distribution. Specifically, a method can include monitoring processes of an application, and scoring objects or components used by the processes to determine placement of the objects or components in memory during initiation of the application. The method can also include, during initiation of the application, loading, into a first portion of the memory, at least partially, the objects or components scored at a first level. The method can also include, during initiation of the application, loading, into a second portion of the memory, at least partially, the objects or components scored at a second level. The objects or components scored at the second level can be less critical to the application than the objects or components scored at the first level.

19 Claims, 10 Drawing Sheets

(51) Int. Cl.
*G06F 9/445* (2018.01)
*G06F 12/06* (2006.01)
*G06N 3/04* (2023.01)
*G06N 3/08* (2023.01)

(52) U.S. Cl.
CPC ............... *G06N 3/04* (2013.01); *G06N 3/08* (2013.01); *G06F 2212/205* (2013.01)

(56) References Cited

U.S. PATENT DOCUMENTS

| | | | |
|---|---|---|---|
| 6,138,179 | A | 10/2000 | Chrabaszcz et al. |
| 6,976,114 | B1 | 12/2005 | Ware |
| 7,370,288 | B1 | 5/2008 | Simmons et al. |
| 8,001,266 | B1 | 8/2011 | Gonzalez et al. |
| 8,042,109 | B2 | 10/2011 | Johnson et al. |
| 8,402,061 | B1 | 3/2013 | Briggs et al. |
| 8,607,023 | B1 | 12/2013 | Kraipak et al. |
| 8,806,140 | B1 | 8/2014 | Kraipak et al. |
| 8,838,887 | B1 | 9/2014 | Burke et al. |
| 8,943,501 | B1 | 1/2015 | Havemose |
| 9,910,664 | B2 * | 3/2018 | Christopher ............ G06F 8/654 |
| 10,013,500 | B1 | 7/2018 | Mcclintock et al. |
| 10,223,270 | B1 * | 3/2019 | Audenaert ............. G06F 12/00 |
| 11,429,445 | B2 | 8/2022 | Yudanov et al. |
| 11,436,041 | B2 | 9/2022 | Yudanov et al. |
| 11,474,828 | B2 | 10/2022 | Yudanov et al. |
| 2002/0013887 | A1 | 1/2002 | Ting |
| 2004/0230687 | A1 | 11/2004 | Nakamura et al. |
| 2005/0060174 | A1 | 3/2005 | Heyward et al. |
| 2006/0064421 | A1 | 3/2006 | Futagawa |
| 2006/0085679 | A1 | 4/2006 | Neary et al. |
| 2007/0045961 | A1 | 3/2007 | Morris |
| 2007/0070358 | A1 | 3/2007 | Ouchi |
| 2007/0101098 | A1 | 5/2007 | Shin et al. |
| 2007/0226702 | A1 | 9/2007 | Segger |
| 2008/0010431 | A1 | 1/2008 | Chang et al. |
| 2008/0163169 | A1 | 7/2008 | Alcott et al. |
| 2009/0049389 | A1 | 2/2009 | Kuzmanovic |
| 2009/0150541 | A1 | 6/2009 | Georgis |
| 2009/0205034 | A1 | 8/2009 | Williams et al. |
| 2009/0307693 | A1 | 12/2009 | Do et al. |
| 2010/0169708 | A1 | 7/2010 | Rudelic et al. |
| 2010/0205395 | A1 | 8/2010 | Srinivasan |
| 2010/0312955 | A1 | 12/2010 | Hwang et al. |
| 2011/0131569 | A1 | 6/2011 | Heim |
| 2012/0110229 | A1 | 5/2012 | Woo et al. |
| 2012/0246403 | A1 | 9/2012 | Mchale et al. |
| 2013/0024609 | A1 | 1/2013 | Gorobets et al. |
| 2013/0060946 | A1 | 3/2013 | Kenneth et al. |
| 2013/0124814 | A1 | 5/2013 | Carter et al. |
| 2014/0068240 | A1 | 3/2014 | Nightingale et al. |
| 2014/0122329 | A1 | 5/2014 | Naggar et al. |
| 2014/0168055 | A1 | 6/2014 | Smith |
| 2014/0201126 | A1 | 7/2014 | Zadeh et al. |
| 2014/0372356 | A1 | 12/2014 | Bilal et al. |
| 2015/0081964 | A1 | 3/2015 | Kihara et al. |
| 2015/0106548 | A1 | 4/2015 | Dubois et al. |
| 2015/0106578 | A1 | 4/2015 | Warfield et al. |
| 2015/0106582 | A1 | 4/2015 | Mai et al. |
| 2015/0178219 | A1 | 6/2015 | Aslot et al. |
| 2015/0301743 | A1 | 10/2015 | Nagao et al. |
| 2016/0019206 | A1 | 1/2016 | Mysur et al. |
| 2016/0085481 | A1 | 3/2016 | Antony et al. |
| 2016/0210049 | A1 | 7/2016 | Van Riel et al. |
| 2016/0378583 | A1 | 12/2016 | Nakano et al. |
| 2017/0177085 | A1 | 6/2017 | Sun et al. |
| 2017/0237722 | A1 | 8/2017 | Raman et al. |
| 2017/0262465 | A1 | 9/2017 | Goggin et al. |
| 2017/0315915 | A1 | 11/2017 | Meswani |
| 2018/0024853 | A1 | 1/2018 | Warfield et al. |
| 2018/0046378 | A1 | 2/2018 | Coburn et al. |
| 2018/0046411 | A1 | 2/2018 | Coburn et al. |
| 2018/0204111 | A1 | 7/2018 | Zadeh et al. |
| 2018/0276112 | A1 | 9/2018 | Krauss |
| 2018/0284735 | A1 | 10/2018 | Cella et al. |
| 2018/0293087 | A1 | 10/2018 | Lee et al. |
| 2019/0050163 | A1 | 2/2019 | Dewey et al. |
| 2019/0121350 | A1 | 4/2019 | Cella et al. |
| 2019/0138919 | A1 | 5/2019 | Chen |
| 2019/0156207 | A1 | 5/2019 | Chen |
| 2019/0171187 | A1 | 6/2019 | Cella et al. |
| 2019/0179763 | A1 | 6/2019 | Lo |
| 2019/0188162 | A1 | 6/2019 | Kwon et al. |
| 2019/0190981 | A1 * | 6/2019 | Mani ................... G06F 11/3636 |
| 2019/0220318 | A1 | 7/2019 | Yang et al. |
| 2019/0243570 | A1 | 8/2019 | Mittal et al. |
| 2019/0265915 | A1 | 8/2019 | Greenwood et al. |
| 2019/0324431 | A1 | 10/2019 | Cella et al. |
| 2019/0339688 | A1 | 11/2019 | Cella et al. |
| 2020/0103894 | A1 | 4/2020 | Cella et al. |
| 2020/0133254 | A1 | 4/2020 | Cella et al. |
| 2020/0184278 | A1 | 6/2020 | Zadeh et al. |
| 2020/0225655 | A1 | 7/2020 | Cella et al. |
| 2020/0272566 | A1 | 8/2020 | Saeki |
| 2020/0348662 | A1 | 11/2020 | Cella et al. |
| 2021/0064418 | A1 * | 3/2021 | Natarajan ............... G06F 9/485 |
| 2021/0103446 | A1 | 4/2021 | Yudanov et al. |
| 2021/0103462 | A1 | 4/2021 | Yudanov et al. |
| 2021/0103463 | A1 | 4/2021 | Yudanov et al. |
| 2021/0157646 | A1 | 5/2021 | Yudanov et al. |
| 2021/0157718 | A1 | 5/2021 | Yudanov et al. |

OTHER PUBLICATIONS

U.S. Appl. No. 16/592,529, filed Oct. 3, 2019, 3794, Aug. 31, 2022, Docketed New Case—Ready for Examination, 2195, Dmitri Yudanov, et al.

U.S. Appl. No. 16/592,547, filed Oct. 3, 2019, 7379, Sep. 28, 2022, Patented Case, 2195, Dmitri Yudanov, et al.

U.S. Appl. No. 16/694,345, filed Nov. 25, 2019, 1187, Aug. 22, 2022, 2136, Dmitri Yudanov, et al.

Bergan, et al. "Deterministic Process Groups in dOS." The ACM Digital Library, Association for Computing Machinery, 2021.

International Search Report and Written Opinion, PCT/US2020/053529, mailed on Jan. 20, 2021.

International Search Report and Written Opinion, PCT/US2020/053537, mailed on Jan. 20, 2021.

International Search Report and Written Opinion, PCT/US2020/053532, mailed on Jan. 22, 2021.

International Search Report and Written Opinion, PCT/US2020/061306, mailed on Mar. 9, 2021.

International Search Report and Written Opinion, PCT/US2020/061309, mailed on Mar. 9, 2021.

Kiong, et al. "Memory Access Scheduling Based on Dynamic Multilevel Priority in Shared DRAM Systems." ACM Transactions on Architecture and Code Optimization, vol. 13, No. 4, Article 42, Dec. 2016.

Extended European Search Report, EP20871456.8, mailed on Sep. 20, 2023.

Bigelow, Stephen J., "The application runtime environment is as important as the app." Retrieved from the Internet <https://www.techtarget.com/searchitoperations/tip/The-application-runtime-environment-is-as-important-as-the-app>, Nov. 1, 2017.

* cited by examiner

500

```
┌─────────────────────────────────────────────────────────────┐
│ monitoring usage of an application to determine frequency   │
│ or recency of reads from and writes to memory for the       │
│ application                                                 │
│ 502                                                         │
└─────────────────────────────────────────────────────────────┘
                              │
                              ▼
┌─────────────────────────────────────────────────────────────┐
│ generating patterns of prior executions of the application  │
│ according to frequency or recency of reads from and writes  │
│ to memory for the application                               │
│ 504                                                         │
└─────────────────────────────────────────────────────────────┘
                              │
                              ▼
┌─────────────────────────────────────────────────────────────┐
│ executing a root process of an application to an initial    │
│ point according to patterns of prior executions of the      │
│ application (e.g., at step 210)                             │
│ 506                                                         │
└─────────────────────────────────────────────────────────────┘
                              │
                              ▼
┌─────────────────────────────────────────────────────────────┐
│ receiving a request to start the application from a user    │
│ 508                                                         │
└─────────────────────────────────────────────────────────────┘
                              │
                              ▼
┌─────────────────────────────────────────────────────────────┐
│ starting the application upon receiving the request to      │
│ start the application and by using the root process of the  │
│ application                                                 │
│ 510                                                         │
└─────────────────────────────────────────────────────────────┘
```

FIG. 5

INITIAL DATA DISTRIBUTION FOR DIFFERENT APPLICATION PROCESSES

RELATED APPLICATIONS

The present application is a continuation application of U.S. patent application Ser. No. 16/592,547 filed Oct. 3, 2019, the entire disclosures of which application are hereby incorporated herein by reference.

FIELD OF THE TECHNOLOGY

At least some embodiments disclosed herein relate to root processes for computing systems and to initial data distribution for different application processes in a computing device.

BACKGROUND

The innerworkings of the ANDROID operating system include a zygote that acts as a parent or root process of all ANDROID application processes. In UNIX and operating systems similar to UNIX (such as LINUX and ANDROID), any non-initial process (or any non-zero process) can be at least partially derived from the initial or zero process of the operating system (OS). Thus, the use of the term "zygote" by the ANDROID OS to reference its root process or process 0.

ANDROID is a mobile OS for mobile devices developed by GOOGLE. It is based on a modified version of the LINUX kernel and other open source software, and is designed primarily for mobile devices (e.g., smartphones, tablets, etc.). GOOGLE has also developed versions of ANDROID for the Internet of Things (IoTs). And, versions of ANDROID have been developed for televisions and other household appliances, in-vehicle information systems, wearable smart devices, game consoles, digital cameras, and other types of electronics including PCs.

The creation of a non-zero process by ANDROID, UNIX, or another OS similar to UNIX, occurs when another process executes the system call represented by "fork( )", which causes forking of a process into multiple processes. The process that invoked the forking is the parent process and a newly created process is a child process. In UNIX or operating systems similar to UNIX, the kernel can identify each process by its process identifier, e.g., "0" for the initial or zero process. In UNIX and similar operating systems, the zero process (i.e., process 0) is a root process generated when the OS boots. A first child process (e.g., process 1), known as "init", can at least be partially derived from the zero process and can become the ancestor of every other process in the OS.

BRIEF DESCRIPTION OF THE DRAWINGS

The present disclosure will be understood more fully from the detailed description given below and from the accompanying drawings of various embodiments of the disclosure.

FIGS. 2, 3, 5, 7, and 8 illustrate flow diagrams of example operations that can be performed by the mobile device depicted in FIGS. 1, 4, and 6, in accordance with some embodiments of the present disclosure.

DETAILED DESCRIPTION

Figure 1:
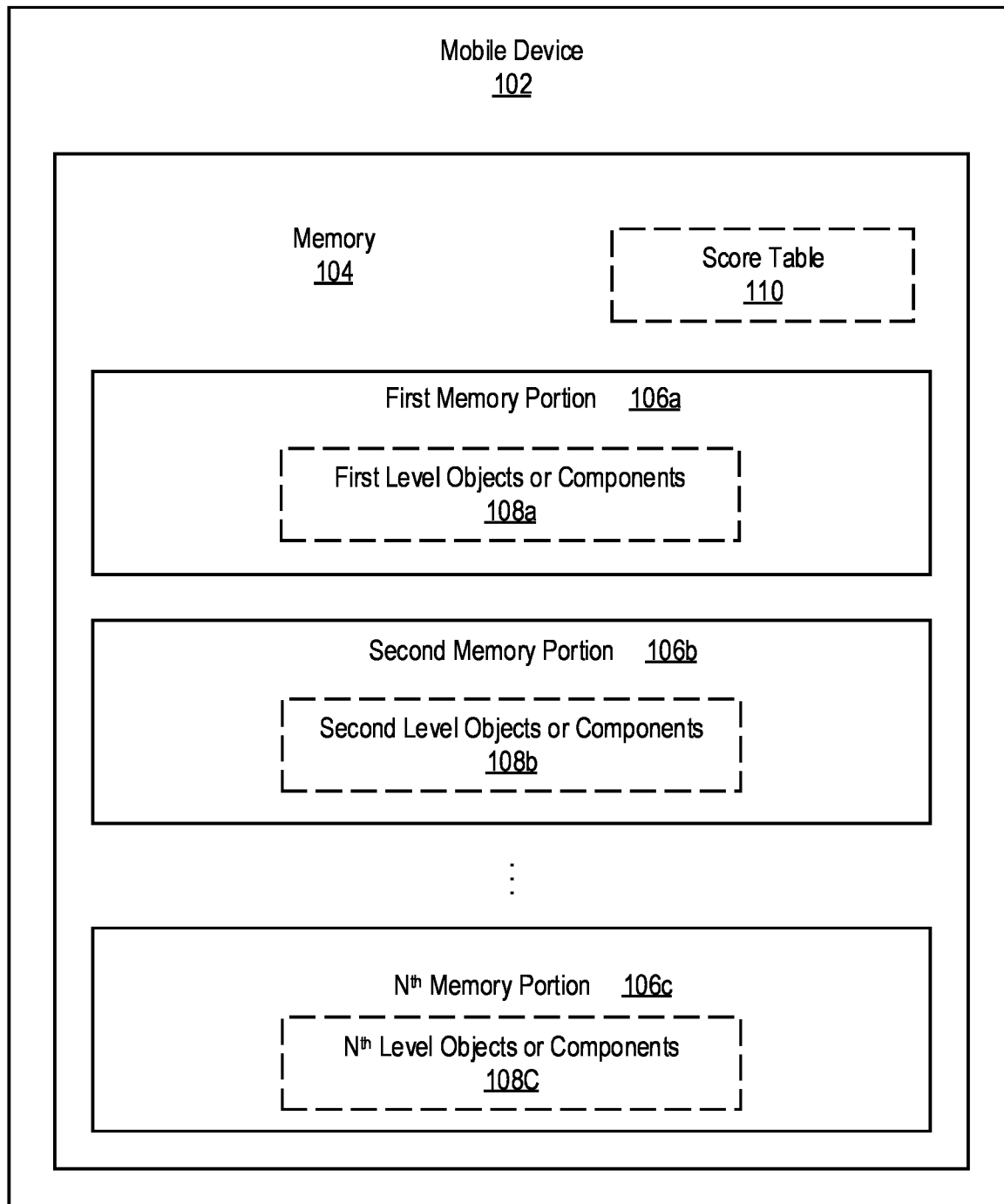
FIGS. 1, 4, and 6 illustrate an example mobile device that can implement initial data distribution for different application processes, in accordance with some embodiments of the present disclosure.

At least some embodiments disclosed herein relate to root processes for computing systems and to initial data distribution for different application processes in a computing device.

Some embodiments disclosed herein relate to a computing device, such as a mobile device, that has memory of different types (e.g., dynamic random-access memory (DRAM), non-volatile random-access memory (NVRAM), 3D XPoint memory, and flash memory). An operating system of the computing device can score different data objects and components of an application to determine where objects and components are initially placed in memory. The objects and components can be placed into different types of memory of the computing device, and the placement of objects and components can occur when the application is initially started.

An initial application process (e.g., a root process of the application) can have executables along with any loadable modules and libraries for execution. These executables and loadable modules and libraries can be loaded in the memory for the application process prior to the application process and during the root process of the application.

Some of the components (such as static members) can be pre-determined to be on a critical path and thus be loaded into a higher performance memory type such as DRAM or SRAM. Some of the components can be pre-determined to be loaded into memory-mapped shared files for inter-process communication (IPC) and thus be loaded into a higher performance memory type such as DRAM or SRAM. Also, higher performance memory types can be explicitly allocated to more critical processes or higher performance shared memory regions can be explicitly allocated to more critical processes (e.g., via either anonymous share memory (Ashmem) or graphics memory allocator (Gralloc)). Some critical user-triggered memory pages of a significant size may go to the higher performance memory type in the device. Critical structures (e.g. related to application runtime environments and system calls) can also be allocated to the higher performance memory type of the device.

The computing device, such as through the OS, can score the components and objects for each application during execution and store the scores in a score table (which can be a part of the application itself). After multiple invocations of an application, by a user, a scoring process (e.g., implemented via counting, training, and/or machine learning processes) can be used to improve the performance of the application. Optionally, the computing device can identify which objects are critical and which are not by having an initial score table.

An object in an application process is by default shared among processes (e.g., after root process forking). When there is a write for the object (e.g., a trigger for a copy-on-write (COW)), the object or a part of it can be moved and/or copied from where it is held into another memory type (e.g., moved and/or copied from NVRAM to DRAM or from DRAM to NVRAM or from DRAM to SRAM) or to the same memory type depending on which bus is less occupied (e.g., depending on bandwidth of DRAM bus or NVRAM bus) or expected to be less occupied in the nearest future. The moving of the component or object can also depend on how heavily the component or object (or its part) is expected to be used or how long it will remain in the memory before it is evicted.

An expectation-maximization algorithm can be used to maximize expected user experience as measured by meaningful metrics (e.g., frames per second, touch-render response time, etc.) and at the same time maximizing, but not over-limiting bus capacity resources of multiple memory types. A shared object can be initially placed in the highest performance type of memory in the device (e.g., DRAM) and gradually copied partly into that memory type and partly into a lower performance type of memory (e.g., NVRAM or flash memory). The gradual copying can be part by part as triggered by COWs. And, after some time the shared object's parts in the highest performance type of memory (e.g., parts in DRAM) can be evicted to the lower performance type of memory (e.g., NVRAM or flash memory) if not used frequently. Alternatively, the parts in the highest performance type of memory can be copied directly into the lower performance type of memory as a whole, or the parts can be moved back and forth between the different types of memory with each write. The operating system may try to keep a user-critical working set of objects in the highest performance type of memory of the computing device (e.g., objects used by the foreground applications and/or running processes in the background). Other objects can be migrated in the lower performance type of memory in the computing device with some critical parts of them still being cached in the higher performance type of memory.

Some embodiments disclosed herein relate to an OS or hypervisor or the like of one or more computing devices that is configured to monitor a plurality of processes of an application. The monitoring can occur for a single computing device or for a group of devices. The OS, hypervisor, or the like can be configured to score objects or components used by the plurality of processes to determine placement of the objects or components in memory during initiation of the application.

During initiation of the application, the OS, hypervisor, or the like can be configured to load, into a first portion of the memory, at least partially, the objects or components scored at a first level. Also, during initiation of the application, the OS, hypervisor, or the like can be configured to load, into a second portion of the memory, at least partially, the objects or components scored at a second level, wherein the objects or components scored at the second level are less critical to the application than the objects or components scored at the first level. The first portion of the memory can include DRAM. The second portion of the memory can include NVRAM. The NVRAM can include 3D XPoint memory.

The initiation of the application can include executing a root process for the application. At least in part, the OS, hypervisor, or the like can be configured to execute a root process for the application. The root process can include the loading of the objects or components scored at the first level and/or the root process can include the loading of the objects or components scored at the second level.

Also, in some embodiments, the initiation of the application can include initiation of an application from a group of applications, and the initiation can include executing a root process for the group of applications. At least in part, the OS, hypervisor, or the like can be configured to execute a root process for the application (or the group of applications).

The root process can include the loading of the objects or components scored at the first level and/or the root process can include the loading of the objects or components scored at the second level.

In some embodiments, OS, hypervisor, or the like can be configured to store, in a score table, corresponding identifications and scores of the scored objects or components. Also, the scoring can be based at least partially on machine learning. In such embodiments, the OS, hypervisor, or the like can be configured to repeat the monitoring of the plurality of processes, the scoring of the objects or components, and the loading of the object or components. And, with each repetition of the monitoring, the scoring, and the loading, the OS, hypervisor, or the like can be configured to train at least part of the scoring of the objects or components. The scoring can be based at least partially on an artificial neural network (ANN), and in such examples the training can include training the ANN.

In some embodiments, the OS, hypervisor, or the like can be configured to move at least some of the objects or components from the first portion of the memory to the second portion of the memory, when usage decreases or is predicted to decrease beyond a first threshold for the at least some of the objects or components loaded in the first portion. Such movement can occur after initiation of the application. Also, the OS, hypervisor, or the like can be configured to move at least some of the objects or components from the second portion of the memory to the first portion of the memory, when usage increases or is predicted to increase beyond a second threshold for the at least some of the objects or components loaded in the second portion. Such movement can occur after initiation of the application as well. Also, after initiation of the application, the OS, hypervisor, or the like can be configured to remove at least some of the objects or components from the second portion of the memory, when usage decreases beyond a third threshold for the at least some of the objects or components in the second portion.

In some embodiments, the OS, hypervisor, or the like can be configured to initiate the application, and the initiation of the application includes the OS, hypervisor, or the like executing a root process for the application to an initial point according to patterns of prior executions of the application. Also, the OS, hypervisor, or the like can be configured to initiate the application when the application is part of a group of applications, and the initiation of the application includes the OS, hypervisor, or the like executing a root process for the application (or executing a root process for the group of applications) to an initial point according to patterns of prior executions of the application (or the group of applications). Also, the OS, hypervisor, or the like can be configured to receive a request to start the application from a user of the computing device(s), as well as start the application in the computing device(s) upon receiving the request to start the application and by using the root process of the application (or by using the root process of the group of applications).

In some embodiments, the OS, hypervisor, or the like can be configured to fork the root process of the application (or fork the root process of the group of applications) into multiple processes. In such embodiments, the OS, hypervisor, or the like can be configured to start the application in the computing device(s) upon receiving the request to start the application and by using at least one of the multiple processes according to the request to start the application. At least some of the multiple processes can be different from each other and/or the root process. Also, at least some of the multiple processes can be identical to each other and/or the root process initially.

The root process for an application (or for a group of applications) can be launched on startup of the OS, hypervisor or the like. In some embodiments, the root process of the application (or the root process of the group of applications) can be killed if the application is not used within a certain time period or if application consumes too much system resources such as CPU, GPU, memory or other resource. In such embodiments, in anticipation of use of the application, the OS, hypervisor or the like can be configured to re-launch the root process according to identified patterns in the monitoring of the application. Preference to patterns can be based on quantity, frequency and/or recency of the patterns, and any type of memory access patterns for the application can be monitored and tracked. The monitoring and tracking can include hardware and software performance counters, which are available through an OS via reading and writing special registers (e.g., model specific registers). Patterns can be based on metrics such as quantity, frequency and/or recency of reads from memory, writes to memory, address patterns in physical memory space, address patterns in virtual space, locality of data (spatially and/or temporally), bank conflicts, or CPU cycles per instruction. Patterns can also be based on metrics such as quantity, frequency and/or recency of translation lookaside buffer (TLB) metrics and other metrics available to an OS.

In some embodiments, after an application is installed in a computing device (such as a mobile device), the OS of the device or an associated hypervisor can pre-launch the application to generate root application process that is customized for the user. The pre-launch can occur before the user requests the computing device to start the application. The application can be executed at least partially via an OS or hypervisor or the like. Thus, the pre-launch process or root process of the application is different from the root process of the OS. In such embodiments, the OS or hypervisor or the like can move and/or copy data to set up the root process of the application. In some embodiments, the copying and/or moving of the data initially can be done by a root process of the OS. This can occur before any initial reads or writes for the application such as by a root process of the application. In some embodiments, common code and read-only data (e.g. libraries, runtimes, drivers, memory pages) are not copied and/or moved by the root process of the OS or a respective root process of an application. In some embodiments, code and data of a root process are not copied until initial modification of code and data by a root process, another process or the OS. In some embodiments, only modified parts of code and data are copied, but not modified parts remain common. In some embodiments these parts can be identified by monitoring writes to memory pages, cache lines or file system sectors or other elements of computer-readable storage medium.

Initial reads and writes can be stored or cached in memory to be used via a respective root process particularly for the application or for a group of applications which include the application. In some embodiments, storing or caching can be done in faster memory for accelerating the initial reads and writes. The initial reads and writes can be managed, maintained, prioritized etc., by the OS, hypervisor or the like, via the memory, according to frequency of use, recency of use, etc.

The computing device (e.g., a mobile device) can monitor the frequent or recent usage of the application by the user to determine initial reads and writes to add to the root process of the application (or the root process of the group of applications). This can cause the OS, hypervisor, or the like to read from and/or write into memory for the application. The data moving and/or copying as a result of the initial writes can also be performed before the user requests the OS, hypervisor or the like to start the application.

After the OS, hypervisor, or the like forks a system-level root process, the predicted initial reads and/or writes for the application can be used to customize the application's root process or the group's root process. In such examples, the customized root process of the application or group can be saved in a persistent non-volatile memory (e.g., flash memory and/or NVRAM) for fast starting of the application.

When the user requests the OS, hypervisor, or the like to start the application, the OS, hypervisor, or the like can use the pre-launched process of the application or the group of applications (i.e., the root process of the application or the group of applications), or a forked process from the pre-launched process to service the user. The forked process from the root process of the application or the root process of the group of applications can be similar to or different from its parent root process.

Also, when the user kills the application, the OS can kill the active process of the application and/or the root process of the application or the group of applications, completely or partially. In anticipation that the user will run the application, the OS, hypervisor, or the like can re-launch the root process of the application or the group of applications, which can be further customized based on most recent and/or frequent user usage patterns of the application.

Figure 4:
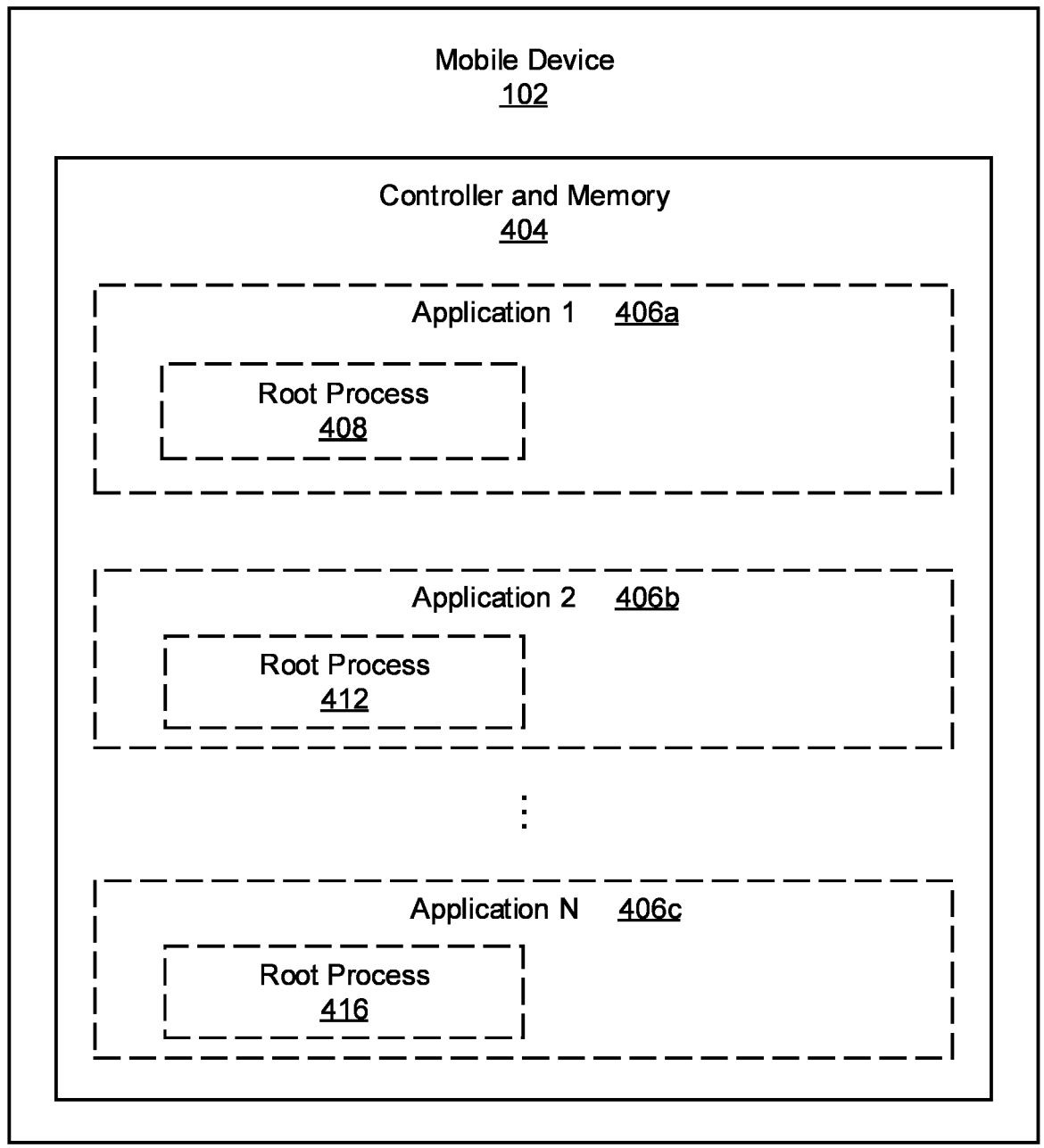
Figure 6:
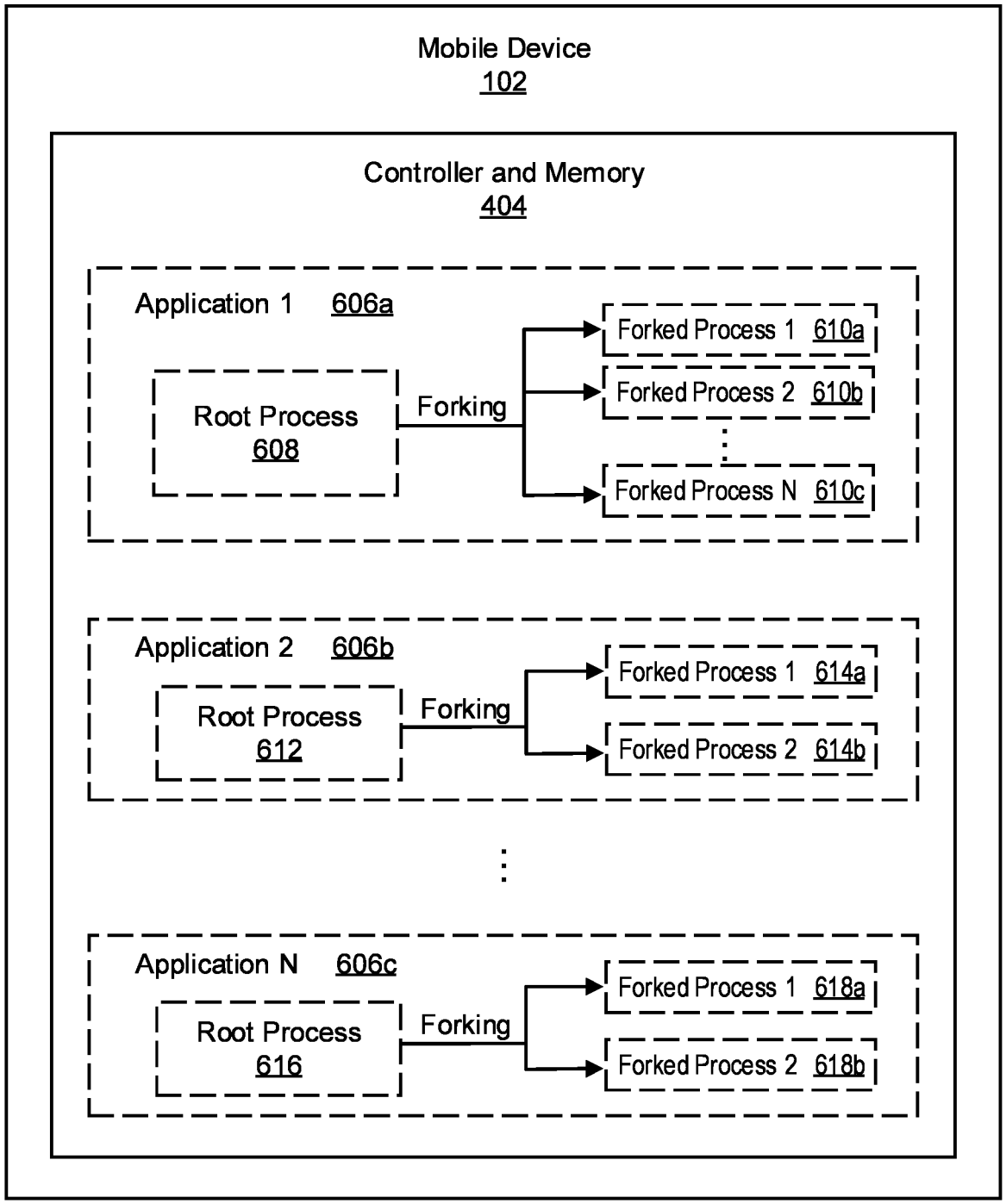

FIGS. 1, 4, and 6 illustrate an example mobile device 102 that can implement initial data distribution for different application processes, in accordance with some embodiments of the present disclosure. Also, as shown in FIGS. 4 and 6, the mobile device 102 can include and run respective root processes for multiple applications, in accordance with some embodiments of the present disclosure. For the purposes of this disclosure, it is to be understood that although FIGS. 1, 4, and 6 refer to a root process per application, such an application can be a part of a group of applications and the root process can be a root process for the group of applications.

FIGS. 2, 3, 5, 7, and 8 illustrate flow diagrams of example methods 200, 300, 500, 700 and 800 that can be performed by the mobile device 102 depicted in FIGS. 1, 4, and 6, in accordance with some embodiments of the present disclosure.

Specifically, FIG. 1 Illustrates mobile device 102 that at least includes memory 104. FIG. 1 also shows the memory 104 including separate memory portions (e.g., see first memory portion 106a, second memory portion 106b, and $N^{th}$ memory portion 106c). Each of the separate memory portions can include objects and/or components of a corresponding level (e.g., see first level objects or components 108a, second level objects or components 108b, and $N^{th}$ level objects or components 108c). The corresponding level can be associated with importance or criticality to an execution of an application. In other words, each of the separate memory portions can include objects and/or components of a corresponding level that relates to the objects' and/or components' importance or criticality to an execution of an application. Also, it is to be understood by the illustration that more than two (or more than three) memory portions can exist for a corresponding number of levels of objects and/or components in the memory 104 of mobile device 102.

An OS in the mobile device 102, or hypervisor in or communicatively coupled to mobile device, or the like can be configured to monitor a plurality of processes of an application included in and runnable in the mobile device. The OS, hypervisor, or the like can be configured to score objects or components (e.g., see first level objects or components 108a, second level objects or components 108b, and $N^{th}$ level objects or components 108c) used by the plurality of processes to determine placement of the objects or components in memory during initiation of the application (e.g., see memory 104). During initiation of the application, the OS, hypervisor, or the like can be configured to load, into a first portion of the memory (e.g., see first memory portion 106a), at least partially, the objects or components scored at a first level (e.g., see first level objects or components 108a). Also, during initiation of the application, the OS, hypervisor, or the like can be configured to load, into a second portion of the memory (e.g., see second memory portion 106b), at least partially, the objects or components scored at a second level (e.g., see second level objects or components 108b). The objects or components scored at the second level can be less critical to the application than the objects or components scored at the first level.

Each of the memory portions can be made of one or more types of memory. And, each of the memory portions can provide different functionality or tradeoffs. For example, the first memory portion 106a or the highest memory portion can provide the highest performance with respect to read and write speed of the separate portions of memory. The second memory portion 106b, or the second highest memory portion can provide the second highest performance with respect to read and write speed of the separate portions of memory. The lowest memory portion (e.g., see the $N^{th}$ memory portion 106c) can provide the lowest performance with respect to read and write speed of the separate portions of memory. However, as a tradeoff the lowest memory portion can provide the greatest memory capacity, data reliability, validity, or persistence. To provide such functionality, the first memory portion 106a or the highest memory portion can include DRAM or SRAM, or a combination of NVRAM and DRAM. Also, in such an example, the second memory portion 106b, or the second highest memory portion can include NVRAM, or a combination of DRAM, NVRAM, and/or flash memory. And, in such an example, the lowest memory portion (e.g., see the $N^{th}$ memory portion 106c) can include flash memory, or a combination of NVRAM and/or flash memory. In all examples disclosed herein the NVRAM can include 3D XPoint memory.

The initiation of the application (e.g., see applications 406a, 406b, and 406c shown in FIG. 4) can include executing a root process for the application (e.g., see root processes 408, 412, and 416 shown in FIG. 4). At least in part, the OS, hypervisor, or the like can be configured to execute a root process for the application. The root process can include the loading of the objects or components scored at one or more levels. For example, the root process can include the loading of the objects or components scored at the first level (e.g., see first level objects or components 108a) and/or the root process can include the loading of the objects or components scored at the second level (e.g., see second level objects or components 108b).

In some embodiments, OS, hypervisor, or the like can be configured to store, in a score table (e.g., see score table 110 shown in FIG. 1), corresponding identifications and scores of the scored objects or components (e.g., see first level objects or components 108a, second level objects or components 108b, and $N^{th}$ level objects or components 108c).

In some embodiments, the score table 110 can be a part of an application binary file of the OS of the mobile device 102.

In such embodiments, the score table can be available to the user each time user updates the OS of the mobile device 102. Also, the score table 110 can be synchronized with other devices of the user via a cloud.

Also, the scoring can be based at least partially on machine learning. In such embodiments, the OS, hypervisor, or the like can be configured to repeat the monitoring of the plurality of processes, the scoring of the objects or components, and the loading of the object or components. And, with each repetition of the monitoring, the scoring, and the loading, the OS, hypervisor, or the like can be configured to train at least part of the scoring of the objects or components. The scoring can be based at least partially on an ANN, and in such examples the training can include training the ANN.

In some embodiments, the OS, hypervisor, or the like can be configured to move at least some of the objects or components from the first portion of the memory to the second portion of the memory, when usage decreases or is predicted to decrease beyond a first threshold for the at least some of the objects or components loaded in the first portion (e.g., the objects or components in the first memory portion 106a can be moved to the second memory portion 106b when usage decreases or is predicted to decrease beyond a first threshold for the at least some of the objects or components loaded in the first memory portion 106a). Such movement can occur after initiation of the application. Also, the OS, hypervisor, or the like can be configured to move at least some of the objects or components from the second portion of the memory to the first portion of the memory, when usage increases or is predicted to increase beyond a second threshold for the at least some of the objects or components loaded in the second portion (e.g., the objects or components in the second memory portion 106b can be moved to the first memory portion 106a when usage increases or is predicted to increase beyond a second threshold for the at least some of the objects or components loaded in the second memory portion 106b). Such movement can occur after initiation of the application as well. Also, after initiation of the application, the OS, hypervisor, or the like can be configured to remove at least some of the objects or components from the second portion of the memory or a lower or lowest portion of memory (e.g., see the $N^{th}$ memory portion 106c), when usage decreases beyond a third threshold for the at least some of the objects or components in the second portion, the lower portion, or the lowest portion of memory depending on the embodiment.

Figure 2:
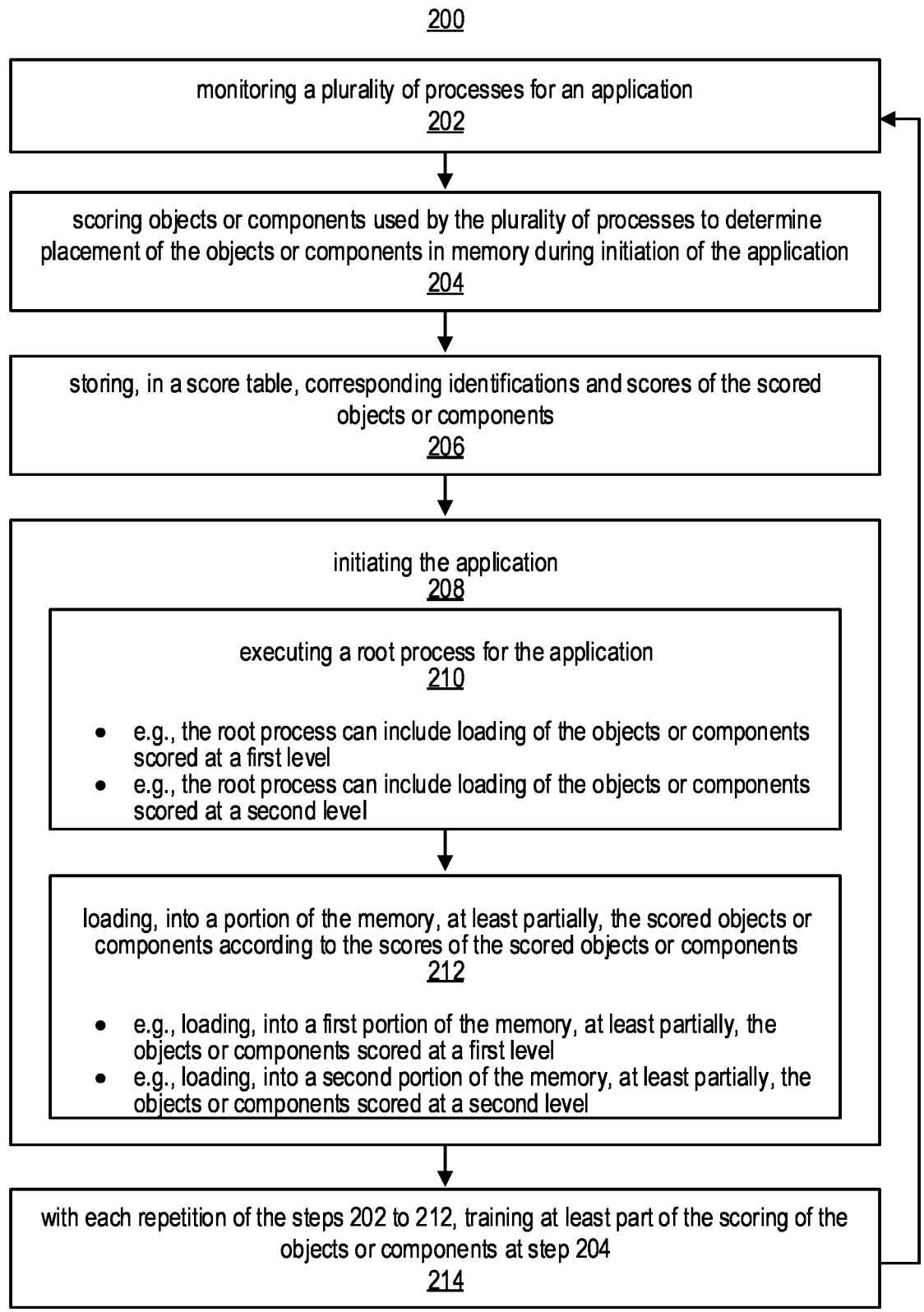

Specifically, FIG. 2 illustrates operations of method 200 that can be performed by the mobile device 102 depicted in FIG. 1 or by another type of computing device configured similarly to the mobile device 102. Also, in some embodiments, the method 200 can be performed at least partially by an OS of a computing device in general or an OS of a mobile device. The method 200 can also be performed at least partially by a hypervisor and/or one or more operating systems.

In FIG. 2, the method 200 begins at step 202 with monitoring a plurality of processes of an application. For example, step 202 can include monitoring, in a computing device (such as a mobile device), a plurality of processes of an application.

At step 204, the method 200 continues with scoring objects or components used by the plurality of processes to determine placement of the objects or components in memory during initiation of the application. For example, step 204 can include scoring, in the computing device, objects or components used by the plurality of processes to determine placement of the objects or components in memory during initiation of the application.

The scoring at step 204 can be based at least partially on machine learning. In such embodiments, the OS, hypervisor, or the like can be configured to repeat the monitoring of the plurality of processes, the scoring of the objects or components, and the loading of the object or components. And, with each repetition of the monitoring, the scoring, and the loading, the OS, hypervisor, or the like can be configured to train at least part of the scoring of the objects or components (e.g., see step 214 of method 200). The scoring at step 204 can be based at least partially on an ANN, and in such examples the training can include training the ANN at step 214.

At step 206, the method 200 continues with storing, in a score table, corresponding identifications and scores of the scored objects or components. For example, step 206 can include storing corresponding identifications and scores of the scored objects or components, and the storing can occur in a score table implemented in memory of the computing device (such as in a score table implemented in memory of a mobile device).

At step 208, the method continues with initiating the application. The initiation of the application can include executing a root process for the application. the root process can include loading of the objects or components scored at a first level (e.g., a highest criticality level) and/or at a second level (e.g., a lower-than-the-highest criticality level). In some embodiments, the monitoring at step 202 and the scoring at step 204 can be a part of the initiating of the application at step 208 (not depicted).

During the initiation of the application, the method continues with executing a root process for the application at step 210. Also, during the initiation of the application, the method continues with loading, into a portion of the memory, at least partially, the scored objects or components according to the scores of the scored objects or components at step 212. The objects or components scored at step 204 at the second level can be less critical to the application than the objects or components scored at step 204 at the first level.

In some embodiments, for example, at step 210, the method 200 can include loading of the objects or components scored at a first level (e.g., a highest criticality level)—via the root process. Also, at step 210, the method 200 can include loading of the objects or components scored at a second level (e.g., a lower-than-the-highest criticality level)—via the root process.

In some embodiments, for example, at step 212, the method 200 can include loading, into a first portion of the memory (e.g., highest performance level portion of memory), at least partially, the objects or components scored at a first level (e.g., a highest criticality level). Also, at step 212, the method 200 can include loading, into a second portion of the memory (e.g., a lower-than-the-highest performance level portion of memory), at least partially, the objects or components scored at a second level (e.g., a lower-than-the-highest criticality level). The first portion of memory and the second portion of memory can be made of one or more types of memory that can have different functionality or tradeoffs. For example, the first portion can provide the highest performance with respect to read and write speed of the separate portions of memory. The second portion can provide the second highest performance with respect to read and write speed of the separate portions of memory. However, as a tradeoff the second portion can provide the greater memory capacity, data reliability, validity, or persistence over the first portion. For example, in some embodiments, the first portion of the memory can include DRAM and the second portion of memory can include NVRAM. The NVRAM can include 3D XPoint memory.

As shown in FIG. 2, the method 200 can repeat itself after the initiation of the application at step 208. For example, the method 200 can include repeating the monitoring of the plurality of processes, the scoring of the objects or components, and the loading of the object or components during initiation of the application. At step 214, the method 200 continues with training at least part of the scoring of the objects or components at step 204 with each repetition of the steps 202 to 212. For example, with each repetition of the monitoring, the scoring, and the loading, the method at step 214 can continue with training at least part of the scoring of the objects or components. In some embodiments, the scoring at step 204 can be based at least partially on an ANN, and the training can include training the ANN at step 214. In some embodiments, the repetition of at least some steps can be done concurrently with other steps. For example, step 202 may be implemented as continuously repeating itself and can stream its output data into step 204 that is also implemented as continuously repeating itself, and so forth. As a result of such embodiments the method 200 can be implemented as a persistent execution pipeline.

Figure 3:
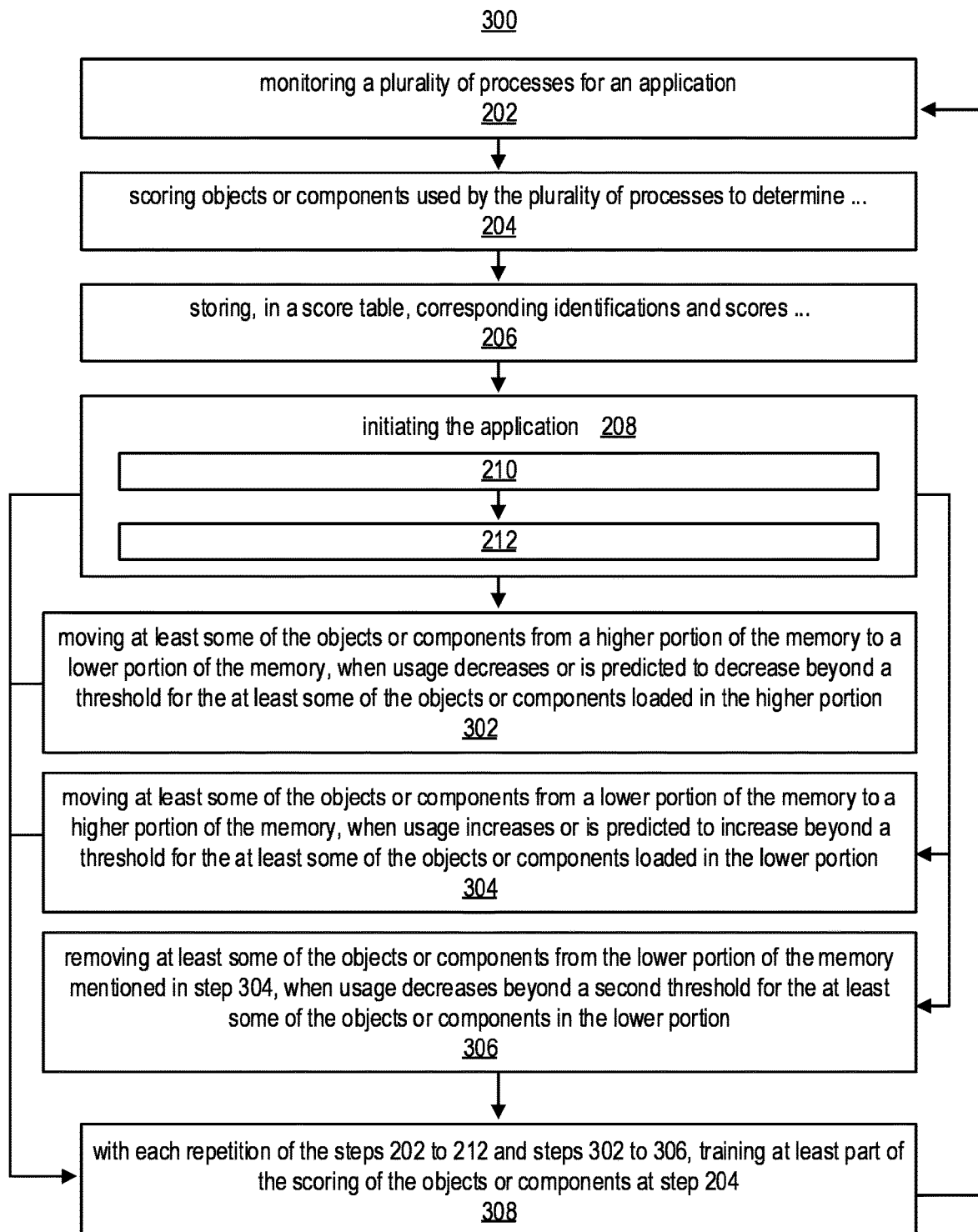

Specifically, FIG. 3 illustrates operations of method 300 that can be performed by the mobile device 102 depicted in FIG. 1 or by another type of computing device configured similarly to the mobile device 102. Also, in some embodiments, the method 300 can be performed at least partially by an OS of a computing device in general or an OS of a mobile device. The method 300 can also be performed at least partially by a hypervisor and/or one or more operating systems.

In FIG. 3, the method 300 begins at step 202 of method 200, with monitoring a plurality of processes of an application. Then, at step 204 of method 200, the method 300 continues with scoring objects or components used by the plurality of processes to determine placement of the objects or components in memory during initiation of the application. Then, at step 206 of method 200, the method 300 continues with storing, in a score table, corresponding identifications and scores of the scored objects or component. Then, at step 208 of method 200, the method 300 continues with initiating the application. During the initiation of the application, the method 300 also continues with executing a root process for the application at step 210. Also, during the initiation of the application, the method 300 continues with loading, into a portion of the memory, at least partially, the scored objects or components according to the scores of the scored objects or components at step 212.

At step 302, the method 300 continues with moving at least some of the objects or components from a higher portion of the memory to a lower portion of the memory, when usage decreases or is predicted to decrease beyond a threshold for the at least some of the objects or components loaded in the higher portion. At step 304, the method 300 continues with moving at least some of the objects or components from a lower portion of the memory to a higher portion of the memory, when usage increases or is predicted to increase beyond a threshold for the at least some of the objects or components loaded in the lower portion. At step 306, the method 300 continues with removing at least some of the objects or components from the lower portion of the memory mentioned in step 304, when usage decreases beyond a second threshold for the at least some of the objects or components in the lower portion.

At step 308, the method 300 continues with training at least part of the scoring of the objects or components at step 204 with each repetition of the steps 202 to 212 and steps 302 to 306. It should be understood that the repetition of at least some steps can be done concurrently with other steps. For example, step 302 and 304 may be implemented as continuously repeating, and so forth. As a result of such embodiments the method 300 can be implemented as a persistent execution pipeline.

Some embodiments disclosed herein relate to a computing device, such as a mobile device, that has memory of different types (e.g., DRAM, NVRAM, 3D XPoint memory, and flash memory), e.g., see mobile device 102 and its different portions of memory 106a, 106b, and 106c shown in FIG. 1). An operating system of the computing device or another system in the device can score different data objects and components of an application (e.g., see objects or components 108a, 108b, and 108c shown in FIG. 1) to determine where objects and components are initially placed in memory, e.g., see step 204 shown in FIGS. 2 and 3. The objects and components can be placed into different types of memory of the computing device, and the placement of objects and components can occur when the application is initially started, e.g., see steps 208 to 212 shown in FIGS. 2 and 3.

An initial application process (e.g., a root process of the application) can have executables along with any loadable modules and libraries for execution. These executables and loadable modules and libraries can be loaded in the memory for the application process prior to the application process and during the root process of the application, e.g., see steps 208 to 212 shown in FIGS. 2 and 3.

Some of the components (such as static members) can be pre-determined to be on a critical path and thus be loaded into a higher performance memory type such as DRAM, e.g., which can be included in steps 204 and 212 respectively. Some of the components can be pre-determined to be loaded into memory-mapped shared files for inter-process communication (IPC) and thus be loaded into a higher performance memory type such as DRAM, e.g., which can be included in steps 204 and 212 respectively. Also, higher performance memory types can be explicitly allocated to more critical processes or higher performance shared memory regions can be explicitly allocated to more critical processes (e.g., via either anonymous share memory (Ashmem) or graphics memory allocator (Gralloc)), e.g., which can be included in step 204. Some critical user-triggered memory pages of a significant size may go to the higher performance memory type in the device. Critical structures (e.g. related to application runtime environments and system calls) can also be allocated to the higher performance memory type of the device, e.g., which can be included in step 204.

The computing device, such as through the OS or the like, can score the components and objects for each application during execution and store the scores in a score table (which can be a part of the application itself), e.g., see steps 204 and 206. After multiple invocations of an application, by a user, a scoring process (e.g., implemented via counting, training, and/or machine learning processes) can be used to improve the performance of the application, e.g., see steps 214 and 308. Optionally, the computing device can identify which objects are critical and which are not by having an initial score table.

An object in an application process is by default shared among processes (e.g., after root process forking). In step 302 or 304, when there is a write for the object (e.g., a trigger for a copy-on-write (COW)), the object or a part of it can be moved and/or copied from where it is held into another memory type (e.g., moved and/or copied from NVRAM to DRAM or from DRAM to NVRAM) or to the same memory type depending on which bus is less used (e.g., depending on bandwidth of DRAM bus or NVRAM bus) or expected to be less used in the nearest future. The moving of the component or object at steps 302 and 304 can also depend on how heavily the component or object (or its part) is expected to be used or how long it will remain in the memory before it is evicted.

In some embodiments, an intelligent COW can be used from a root process to an application process. The implementation of an intelligent COW can be a function of inputs including current and predicted memory bus traffic, object usage, predicted time until when the COW is no longer effective, and sensible by user metrics (e.g., frames-per-second, screen response, etc.). The intelligent COW can be improved via an expectation-maximization algorithm using inputs such as the current and predicted memory bus traffic, object usage, predicted time, and user-related metrics.

In step 204, an expectation-maximization algorithm can be used to maximize expected user experience as measured by meaningful metrics (e.g., frames per second, touch-render response time, etc.) and maximizing bus capacity resources of multiple memory types.

In step 302, a shared object can be initially placed in the highest performance type of memory in the device (e.g., DRAM) and gradually copied partly into that memory type and partly into a lower performance type of memory (e.g., NVRAM or flash memory). The gradual copying can be part by part as triggered by COWs. And, over time the shared object's parts in the highest performance type of memory (e.g., parts in DRAM) can be evicted to the lower performance type of memory (e.g., NVRAM or flash memory) if not used frequently. Or the parts in the highest performance type of memory can be copied directly into the lower performance type of memory as a whole, or the parts can be moved back and forth between the different types of memory with each write, such as between steps 302 and 304.

The back and forth between the different types of memory can include ping-ponging between the different types of memory. Ping-ponging can be or include a high-level algorithm in which parts of an object are copied or moved from one memory portion or type to another. For example, a new process can be forked and it writes to some part's shared object. Suppose memory bus A is busy and bus B is free. A read-modify-write of the part of the object then can be moved from memory A to memory B via ping-ponging. Also, another process can be forked from a process with its part of the object in memory B. And, suppose memory bus A is busy and bus B is free. A read-modify-write of the part of object then can be moved from one portion of memory B back to the same portion or another portion of memory B. If memory bus B is busy and bus A is free, a read-modify-write of the part of the object can be moved from memory B to memory A.

The operating system may try to keep a user-critical working set of objects in the highest performance type of memory of the computing device (e.g., objects used by the foreground applications and/or running processes in the background). Other objects can be migrated in the lower performance type of memory in the computing device with some critical parts of them still being cached in the highest performance type of memory.

In some embodiments, the OS (or hypervisor, or the like) can be configured to initiate the application, and the initiation of the application includes the executing of a root process for the application to an initial point according to patterns of prior executions of the application. Also, the OS (or hypervisor, or the like) can be configured to receive a request to start the application from a user of the computing device, as well as start the application in the computing device upon receiving the request to start the application and by using the root process of the application.

Specifically, FIG. 4 Illustrates mobile device 102 that at least includes a controller and memory 404, which can implement creation of customized root processes for individual applications or groups of applications. The memory of the controller and memory 404 can include the memory 104 shown in FIG. 1. The controller and memory 404 of mobile device 102 can include instructions and data for applications executed in the mobile device (e.g., see applications 406a, 406b, and 406c). The controller of the mobile device 102 can execute the instructions for the applications based on the data. The data can include application instruction code in binary format or in a format suitable for interpreting by programming language interpreter. The data can include some data structures, libraries etc. The controller can also hold the instructions and data in registers of the controller. The memory can hold the instructions and data in its memory cells. In some embodiments, the memory cells of the memory of the mobile device 102 can include flash memory cells and/or NVRAM cells. The NVRAM cells can be or include 3D XPoint memory cells.

In some embodiments, the memory can have different speeds, latencies, bandwidths and other parameters. For example, SRAM memory can be used as high-speed cache, DRAM as the main memory, and NVRAM as storage memory.

The instructions and data for each application included and runnable in the mobile device 102 can include root process data and instructions for a root process of the application. The respective root process of an application included in the mobile device 102 (e.g., see root process 408 of application 406a, root process 412 of application 406b, and root process 416 of application 406c) can be implemented by the controller and the memory 404. The controller can be configured to execute the instructions of the root process according to the instructions and data for the root process, and the memory can be configured to hold or store the instructions and the data for execution of the root process by the controller.

In FIGS. 4 and 6, it is shown that a root process corresponds to a single application (e.g., see root process 408 and corresponding application 406a as well as root process 608 and corresponding application 606a). It is to be understood that a root process can be forked into multiple processes that can be used by the single application or by multiple applications including the single application. For example, if the single application is in a group of applications, a root process for the group can be forked into multiple forked processes and the multiple forked processes can be used by the applications in the group. Also, a single application in a group of applications can use multiple different forked processes. For example, application 606a (which can be part of a group of apps) can use forked processes 610a, 610b, and 610c. Note that the other apps in the group having application 606a are not depicted in FIG. 6. Also, as mentioned, multiple applications of a group can use multiple different forked processes. For example, applications 606a, 606b, and 606c can use forked processes 610a, 610b, and 610c such as if the applications are in the same group (this is not depicted in FIG. 6). Such embodiments can be implemented by merging forking.

In some embodiments, an initial execution of a forked root process can be limited to pre-loading libraries, composing a forked process out of required libraries and initial data structures, and saving the forked process for further reuse. Also, at any time, execution of a forked process can be saved in memory at some state so that it can be re-used in order to avoid spending time on re-executing the process.

For the purposes of this disclosure, it is to be understood that although FIGS. 1, 4, and 6 refer to a root process per application, such an application can be a part of a group of applications and the root process can be a root process for the group of applications.

The other processes of the application included in the mobile device 102 (e.g., see applications 406a, 406b and 406c) can be implemented by the controller and the memory 404 too. The controller can be configured to execute the instructions of the other processes of the application according to the instructions and data for the other processes, and the memory can be configured to hold or store the instructions and the data for execution of the other processes by the controller.

Specifically, FIG. 5 illustrates operations of method 500 that can be performed by the mobile device 102 depicted in FIGS. 1, 4 and 6 or by another type of computing device configured similarly to the mobile device 102. Also, in some embodiments, the method 500 can be performed at least partially by an OS of a computing device in general or an OS of a mobile device. The method 500 can also be performed at least partially by a hypervisor and/or one or more operating systems.

In FIG. 5, the method 500 begins at step 502 with monitoring usage of an application to determine frequency or recency of reads from and writes to memory for the application. In some embodiments (not depicted), the method 500 can begin with monitoring and/or tracking usage of the application to determine quantity, frequency and/or recency of patterns of prior executions of the application.

The patterns of prior executions of the application can include, be related to, or be based on at least quantity, frequency and/or recency of patterns in prior executions of the application that are monitored and/or tracked. The patterns monitored and/or tracked can be any type of pattern of application usage by a user or a machine. For example, any type of pattern of memory access and usage for the application can be monitored and/or tracked. Patterns can include, be related to, or be based on metrics such as quantity, frequency and/or recency of reads from memory, writes to memory, address patterns in physical memory space, address patterns in virtual space, locality of data (spatially and/or temporally), bank conflicts, CPU cycles per instruction, etc.

Also, monitoring and tracking usage of the application can occur during initiation of the application (e.g., including when the application is being loaded to memory) and/or afterwards during running of the application. The monitoring and tracking usage of the application can occur during initiation of the application and at any other period of running the application post-initiation. Monitoring and tracking usage of the application during runtime can facilitate derivation of an effective and/or efficient root process of the application. For example, after initiation a user can touch a screen to trigger some element of application and expect some result. The delivery of that result can be very quick in some embodiments since a critical memory object can be preloaded based on the monitoring that occurs during runtime of the application. In some embodiments, the preloading of the object can be done from slower memory such as NAND-type Flash memory to faster memory such as DRAM.

At step 504, the method 500 continues with generating the patterns of prior executions of the application according to the frequency or recency of reads from and writes to memory for the application. In some embodiments (not depicted), the method 500 can continue with generating the patterns of prior executions of the application according to the quantity, frequency and/or recency of patterns in prior executions of the application that are monitored and/or tracked.

Also, the generated patterns of prior executions of the application can include, be related to, or be based on at least quantity, frequency and/or recency of patterns in prior executions of the application that are monitored and/or tracked. The patterns generated at step 504 can be any type of pattern of application usage by a user or a machine. For example, the patterns generated, at step 504, can include any type of pattern of memory access and usage for the application can be monitored and/or tracked. Also, for example, the generated patterns can include, be related to, or be based on metrics such as quantity, frequency and/or recency of reads from memory, writes to memory, address patterns in physical memory space, address patterns in virtual space, locality of data (spatially and/or temporally), bank conflicts, or any other types of metrics related to usage of the application and memory for the application.

At step 506, the method 500 continues with executing a root process of an application to an initial point according to the patterns of prior executions of the application. Step 506 can include customizing a root process of an application according to patterns of prior executions of the application, and then executing the root process of the application to the initial point according to the patterns of prior executions of the application. Step 506 can also include step 210 shown in FIG. 2. Step 506 can also include step 212 shown in FIG. 2 as well as step 208.

Customizing a root process can be done, but not limited to, composing it from various libraries, using other root processes available by default, forming data structures, and querying various sources over the network for root process components.

Patterns of prior executions of the application can include, be related to, or be based on at least quantity, frequency and/or recency of patterns in prior executions of the application that are monitored and/or tracked. The patterns monitored and/or tracked can be any type of pattern of application usage by a user or a machine. For example, any type of pattern of memory access and usage for the application can be monitored and/or tracked. Patterns of prior executions of the application can include, be related to, or be based on metrics such as at least quantity, frequency and/or recency of any type of pattern of application usage by a user or a machine. For example, patterns can include, be related to, or be based on metrics such as quantity, frequency and/or recency of reads from memory, writes to memory, address patterns in physical memory space, address patterns in virtual space, locality of data (spatially and/or temporally), bank conflicts, CPU cycles per instruction, etc.

The executing the root process of the application can include moving data in memory before any initial writes to and/or reads from memory for the application. Also, the executing the root process of the application can include copying data in memory before any initial writes to and/or reads from memory for the application. And, the moved and/or copied data can include data related to the patterns of prior executions of the application. In some embodiments, the moving and/or copying of data in memory before any initial writes to memory can include avoiding moving and/or copying common code and read-only data. In some embodiments, the method 500 can include, after an OS (or hypervisor) in the computing device forks a root process for the OS (or hypervisor), executing predicted initial writes and/or reads for the application to customize the executing of the root process of the application such that the root process of the application is an application-level process for the application.

Also, the method 500 can include storing data for the root process of the application in flash memory before at least part of the execution of the root process (not depicted in the drawings). The method 500 can also include storing data for the root process of the application in NVRAM before at least part of the execution of the root process (not depicted in the drawings). The NVRAM can include 3D XPoint memory. In some embodiments storing new data can overwrite old unused data related to the usage of the applications.

At step 508, the method 500 continues with receiving a request to start the application from a user. At step 510, the method 500 continues with starting the application upon receiving the request to start the application and by using the root process of the application. In some embodiments, the method 500 can include executing, at least partially by an OS in a computing device, a root process of an application as a background process according to patterns of prior executions of the application. In such embodiments, the method 500 can also include receiving, by the OS, a request to start the application from a user of the computing device. And, the method 500 can include starting, by the OS, the application in the computing device upon receiving the request to start the application and by using the root process of the application or a forked process of the root process. In some embodiments, code and data of a forked process are not copied until an initial modification of code and data by the application, another process or the OS. In some embodiments, only modified parts of code and data are copied, but not modified parts remain common. In some embodiments, such parts can be identified by monitoring writes to memory pages, cache lines or file system sectors or other elements of computer-readable storage medium.

In some embodiments, executing a root process to an initial point can be done on one device, e.g. in cloud computing environment, then forking it upon receiving a request from another device to start at least one of the applications, then transferring a forked process over network to another device, e.g. mobile device, then using the forked process on a mobile deice as a starting point for application.

Specifically, FIG. 6 Illustrates mobile device 102 that at least includes the controller and memory 404, and the memory of the controller and memory 404 can include the memory 104 shown in FIG. 1. The controller and memory 404 of mobile device 102 can include instructions and data for applications executed in the mobile device (e.g., see applications 606a, 606b, and 606c). The controller of the mobile device 102 can execute the instructions for the applications based on the data. The data can include application instruction code in binary format or in a format suitable for interpreting by programming language interpreter. The data can include some data structures, libraries etc. The controller can also hold the instructions and data in registers of the controller. The memory can hold the instructions and data in its memory cells. In some embodiments, the memory cells of the memory of the mobile device 102 can include flash memory cells and/or NVRAM cells. The NVRAM cells can be or include 3D XPoint memory cells.

As shown in FIG. 6 as well, the instructions and data for each application included and runnable in the mobile device 102 can include root process data and instructions for a root process of the application. The root process of an application included in the mobile device 102, as shown in FIG. 6, e.g., see respective root processes 608, 612 and 616, can be implemented by the controller and the memory 404. The controller configured to execute the instructions of the root process according to the instructions and data for the root process, and the memory configured to hold or store the instructions and the data for execution of the root process by the controller. Also, as illustrated by FIG. 6, the other processes of the application included in the mobile device 102 (e.g., see applications 606a, 606b and 606c) can be implemented by the controller and the memory 404 too. The controller configured to execute the instructions of the other processes of the application according to the instructions and data for the other processes, and the memory configured to hold or store the instructions and the data for execution of the other processes by the controller.

Additionally, as shown in FIG. 6, the controller and memory 404 can include data and instructions for multiple processes forked from the respective root processes of the applications stored and runnable in the mobile device 102 (e.g., see forked processes 610a, 610b, 610c, 614a, 614b, 618a, and 618b). As shown in FIG. 6, at least processes 610a, 610b, and 610c are forked from root process 608; but, there may be more processes forked from root process 608. Also shown, processes 614a and 614b are forked from root process 612. And, processes 618a and 618b are forked from root process 616.

In some embodiments, an operating system of the mobile device 102, or a hypervisor in or associated with the mobile device, is configured to fork a root process of an application (e.g., see root process 608 of application 606a, root process 612 of application 606b, and root process 616 of application 606c) into multiple processes (e.g., see forked processes 610a, 610b, 610c, 614a, 614b, 618a, and 618b). In such embodiments, the operating system, or the hypervisor, can be configured to start the application in the mobile device 102 upon receiving a request to start the application and by using at least one of the multiple forked processes (e.g., see forked processes 610a, 610b, 610c, 614a, 614b, 618a, and 618b) and/or the respective root process according to the request to start the application (e.g., see root process 608 of application 606a, root process 612 of application 606b, and root process 616 of application 606c).

At least some or each of the forked multiple processes can be different from the parent root process of the application. The differences can be based on different applications and different application parts in the computing device to be run. And, at least some or each of the forked multiple processes can be identical to the parent root process of the application at least at some point of execution of the application.

For the purposes of this disclosure, it is to be understood that although FIGS. 1, 4, and 6 refer to a root process per application, such an application can be a part of a group of applications and the root process can be a root process for the group of applications.

Figure 7:
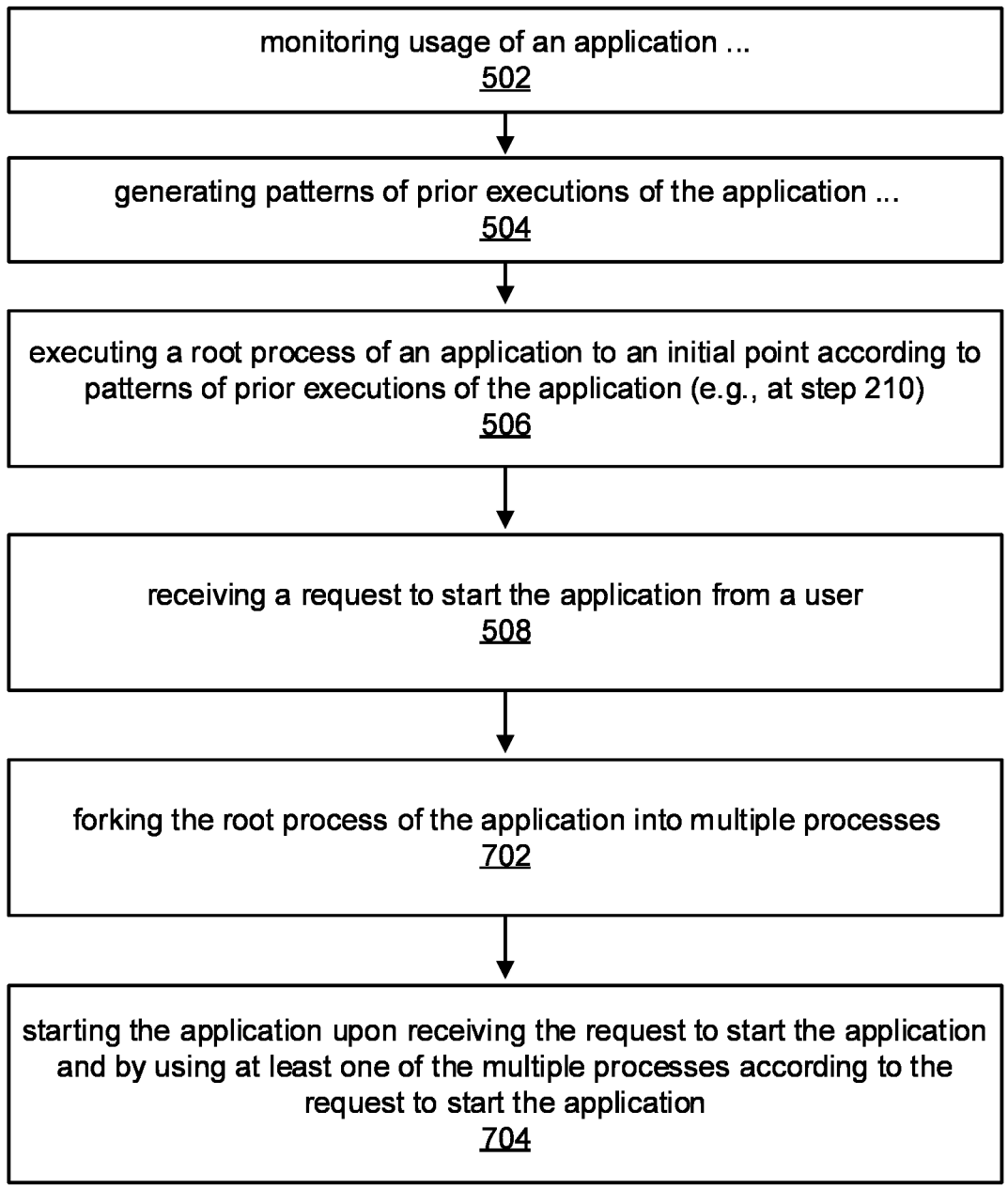

Specifically, FIG. 7 illustrates operations of method 700 that can be performed by the mobile device 102 depicted in FIG. 6 or by another type of computing device configured similarly to the mobile device 102. Also, in some embodiments, the method 700 can be performed by an operating system of a computing device in general or an operating system of a mobile device. The method 700 can also be performed by a hypervisor and/or one or more operating systems.

In FIG. 7 the method 700 begins with steps 502 to 508 of method 500 shown in more detail in FIG. 5. At step 502, the method 700 includes monitoring usage of an application to determine frequency or recency of reads from and writes to memory for the application. At step 504, the method includes generating the patterns of prior executions of the application according to the frequency or recency of reads from and writes to memory for the application. At step 506, the method includes executing a root process of an application to an initial point according to the patterns of prior executions of the application. At step 508, the method includes receiving a request to start the application from a user.

At step 702, the method 700 continues with forking the root process of the application into multiple processes. At step 704, the method 700 continues with starting the application upon receiving the request to start the application and by using at least one of the multiple processes according to the request to start the application. Alternatively, at step 702, the method 700 can continue with starting the application upon receiving the request to start the application and by using a parent root process (e.g., see root process 608) and the multiple processes (e.g., see forked processes 610a, 610b, and 610c) according to the request to start the application.

With respect to method 700, at least some or each of the forked multiple processes can be different from the parent root process of the application. The differences can be based on different applications and different application parts in the computing device to be run. And, at least some or each of the forked multiple processes can be identical to the parent root process of the application at least at some point of execution of the application.

Figure 8:
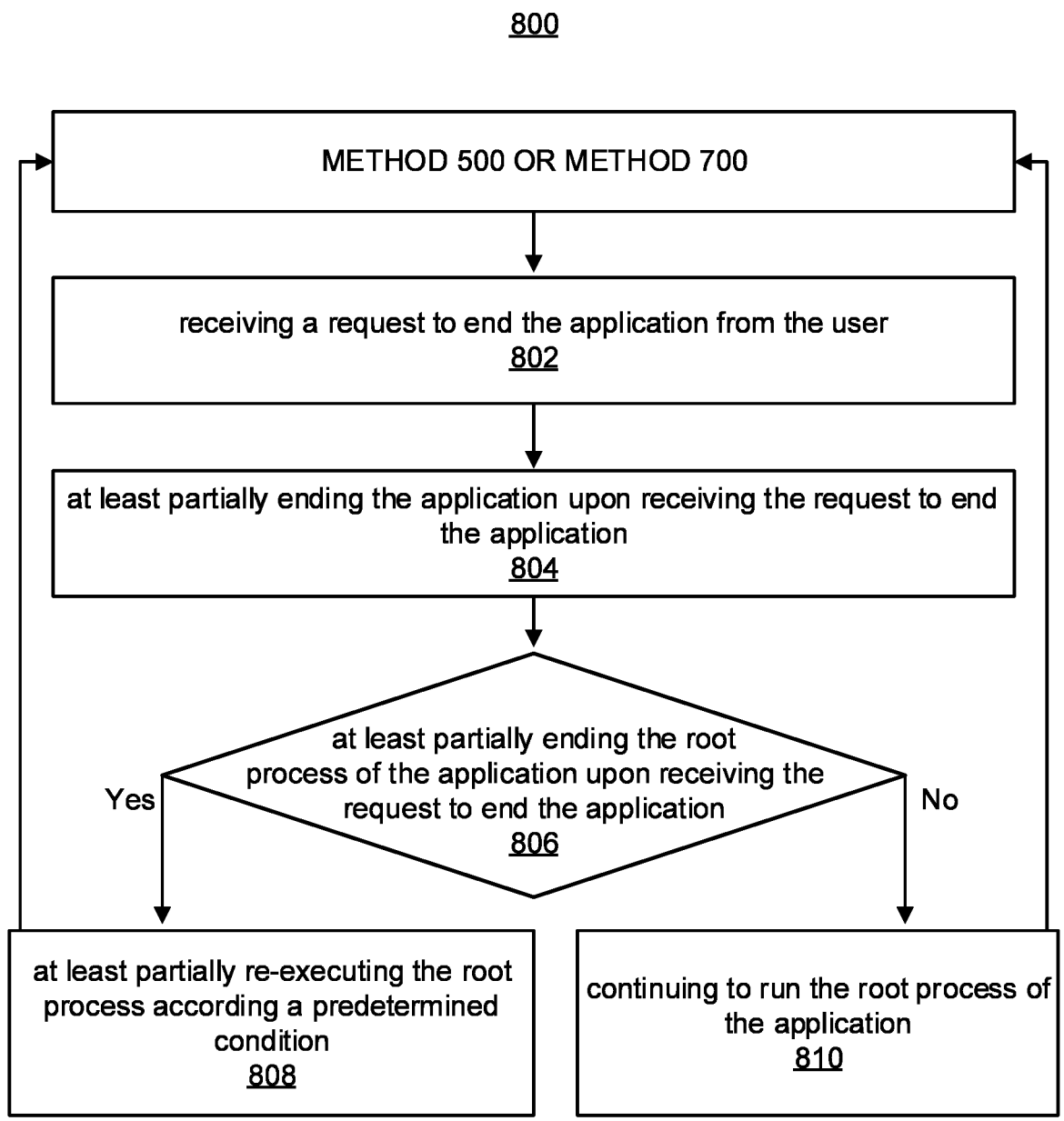

Specifically, FIG. 8 illustrates operations of method 800 that can be performed by the mobile device 102 depicted in FIGS. 1, 4, and 6 or by another type of computing device configured similarly to the mobile device 102. Also, in some embodiments, the method 800 can be performed by an operating system of a computing device in general or an operating system of a mobile device. The method 800 can also be performed by a hypervisor and/or one or more operating systems.

As shown in FIG. 8, the method 800 begins with method 500 shown in FIG. 5 or method 700 shown in FIG. 7. At step 802, the method 800 continues with receiving a request to end the application from the user. For example, at step 802, the method 800 continues with receiving a request to end the application from the user of the computing device (e.g., the user of the mobile device).

At step 804, the method 800 continues with at least partially ending the application upon receiving the request to end the application. At step 806, the method 800 continues with at least partially ending the root process of the application upon receiving the request to end the application.

As shown in FIG. 8, at step 808, when step 806 is completed, the method 800 continues with at least partially re-executing the root process according a pre-determined condition (after at least partially ending the application and the root process). At step 808, the at least partially re-executing of the root process can occur based on the patterns of prior executions of the application. Also, at step 808, the at least partially re-executing of the root process can be updated by the patterns of prior executions of the application.

As shown in FIG. 8, at step 810, when step 806 is not completed, the method 800 moves forward with continuing to run the root process of the application upon receiving the request to end the application. In other words, the method 800 can include receiving a request to end the application from the user of the mobile device at step 802, and then at step 804, it can include at least partially ending the application upon receiving the request to end the application, and then at step 810, it can include continuing to run the root process of the application upon receiving the request to end the application and without stopping the root process in between steps 804 and 810. As a result of this, the root process of the application can be re-used again should the user decide to re-start the at least partly ended application or other application, for which this root-process can be used.

In some embodiments, such as embodiments that can implement methods 500 and 700, the patterns of prior executions of the application are from use of the application on a particular computing device (e.g., a particular mobile device) by a particular user and other users so that the root process is customized for use of the application on the particular computing device by any user.

In some other embodiments, such as some other embodiments that can implement methods 500 and 700, the patterns of prior executions of the application are from use of the application on a particular computing device (e.g., a particular mobile device) by a particular user so that the root process is customized for use of the application on the particular mobile device by the particular user.

In some other embodiments, such as some other embodiments that can implement methods 500 and 700, the patterns of prior executions of the application are from use of a particular application on a particular computing device (e.g., a particular mobile device) and at least one other computing device by a particular user so that the root process is customized for use of the application on the computing device and the at least one other computing device by the particular user.

With respect to the method 200, method 300, method 500, method 700, method 800, or any other method, process, or operation described herein, in some embodiments, a non-transitory computer-readable storage medium stores instructions that, when executed by at least one processing device (such as controller 906 shown in FIG. 9), cause the at least one processing device to perform the method 200, method 300, method 500, method 700, method 800, or any other method, process, or operation described herein, and/or any combination thereof.

For example, some embodiments can include a non-transitory computer-readable storage medium tangibly encoded with computer-executable instructions, that when executed by a processor associated with a computing device, performs a method such as the method 200 shown in FIG. 2. Also, for example, some embodiments can include a non-transitory computer-readable storage medium tangibly encoded with computer-executable instructions, that when executed by a processor associated with a computing device, performs a method such as the method 300 shown in FIG. 3, the method 500 shown in FIG. 5, the method 700 shown in FIG. 7, and the method 800 shown in FIG. 8.

Also, for example, some embodiments can include a non-transitory computer-readable storage medium tangibly encoded with computer-executable instructions, that when executed by a processor associated with a computing device, can perform a method that includes monitoring, in a mobile device, a plurality of processes for an application. The method can also include scoring objects or components used by the plurality of processes during the initiation of the application to determine placement of the objects or components in memory during initiation of the application. And, during initiation of the application, the method can also include loading, into a first portion of the memory, the objects or components scored at a first level, as well as loading, into a second portion of the memory, the objects or components scored at a second level. The objects or components scored at the second level can be less critical to initiation of the application than the objects or components scored at the first level.

Also, for example, some embodiments can include a method that includes monitoring, by an OS in a mobile device, a plurality of processes for an application during initiation of the application. The monitoring of the plurality of processes can occur in a background process. The method can also include scoring objects or components used by the plurality of processes during the initiation of the application to determine placement of the objects or components in memory during initiation of the application. And, during initiation of the application, the method can include loading, into a first portion of the memory, the objects or components scored at a first level, as well as loading, into a second portion of the memory, the objects or components scored at a second level. The objects or components scored at the second level can be less critical to initiation of the application than the objects or components scored at the first level.

Figure 9:
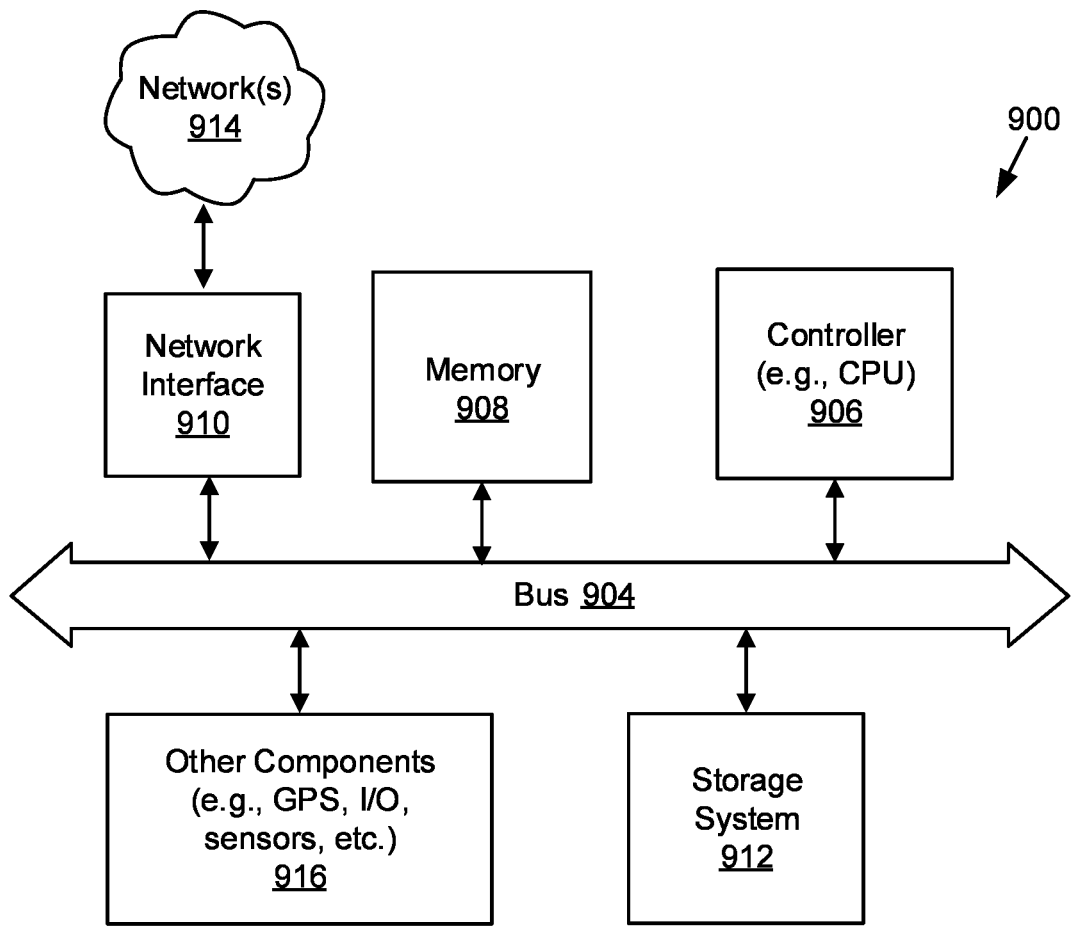
FIG. 9 illustrates an example computing device that can implement initial data distribution for different application processes, in accordance with some embodiments of the present disclosure.

FIG. 9 illustrates an example computing device 900 that can implement initial data distribution for different application processes, in accordance with some embodiments of the present disclosure. The computing device 900 can also implement creation of customized root processes for individual applications or groups of applications, in accordance with some embodiments of the present disclosure. The device 900 can be or include or be a part of mobile device 102 or any other type of computing device that is or is somewhat similar to a mobile device—such as a smartphone, tablet computer, IoT device, smart television, smart watch, glasses or other smart household appliance, in-vehicle information system, wearable smart device, game console, PC, digital camera, or any combination thereof. As shown, the device 900 can be connected to communications network(s) 914 that includes at least a wide area network (WAN), a local area network (LAN), an intranet, an extranet, the Internet, and/or any combination thereof.

Each of the computing or mobile devices described herein (such as mobile device 102 or computing device 900) can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the device 900 shown in FIG. 9 as well as the mobile device 102 shown in FIGS. 1, 4 and 6, the term "machine" shall also be taken to include any collection of machines that individually or jointly execute a set (or multiple sets) of instructions to perform any one or more of the methodologies or operations discussed herein. And, each of the illustrated computing or mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over network to another device such that another device can continue with other steps of the methods described herein.

FIG. 9 also illustrates example parts of the example computing device 900, in accordance with some embodiments of the present disclosure. The device 900 can be communicatively coupled to the network(s) 914 as shown. The device 900 includes at least a bus 904, a controller 906 (such as a CPU), memory 908, a network interface 910, a data storage system 912, and other components 916 (which can be any type of components found in mobile or computing devices such as GPS components, I/O components, and sensors). The other components 916 can include one or more displays, different types of sensors, audio and/or visual input/output devices, additional application-specific memory, one or more additional controllers (e.g., GPU), or any combination thereof. The bus 904 communicatively couples the controller 906, the memory 908, the network interface 910, the data storage system 912 and the other components 916. The device 900 includes a computer system that includes at least controller 906, memory 908 (e.g., read-only memory (ROM), flash memory, DRAM such as synchronous DRAM (SDRAM) or Rambus DRAM (RDRAM), static random-access memory (SRAM), etc.), and data storage system 912, which communicate with each other via bus 904 (which can include multiple buses).

To put it another way, FIG. 9 is a block diagram of an example device 900 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 910) to other machines in a LAN, an intranet, a mobile wireless network such as 4G or 5G, an extranet, and/or the Internet (e.g., network(s) 914). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Controller 906 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 906 can also be one or more special-purpose processing devices such as an application specific integrated circuit (ASIC), a field programmable gate array (FPGA), a digital signal processor (DSP), network processor, or the like. Controller 906 is configured to execute instructions for performing the operations and steps discussed herein. Controller 906 can further include a network interface device such as network interface 910 to communicate over one or more communications network (such as network(s) 914).

The data storage system 912 can include a machine-readable storage medium (also known as a computer-readable medium) on which is stored one or more sets of instructions or software embodying any one or more of the methodologies or functions described herein. The instructions can also reside, completely or at least partially, within the memory 908 and/or within the controller 906 during execution thereof by the computer system, the memory 908 and the controller 906 also constituting machine-readable storage media. The memory 908 can be or include main memory of the device 900.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 10:
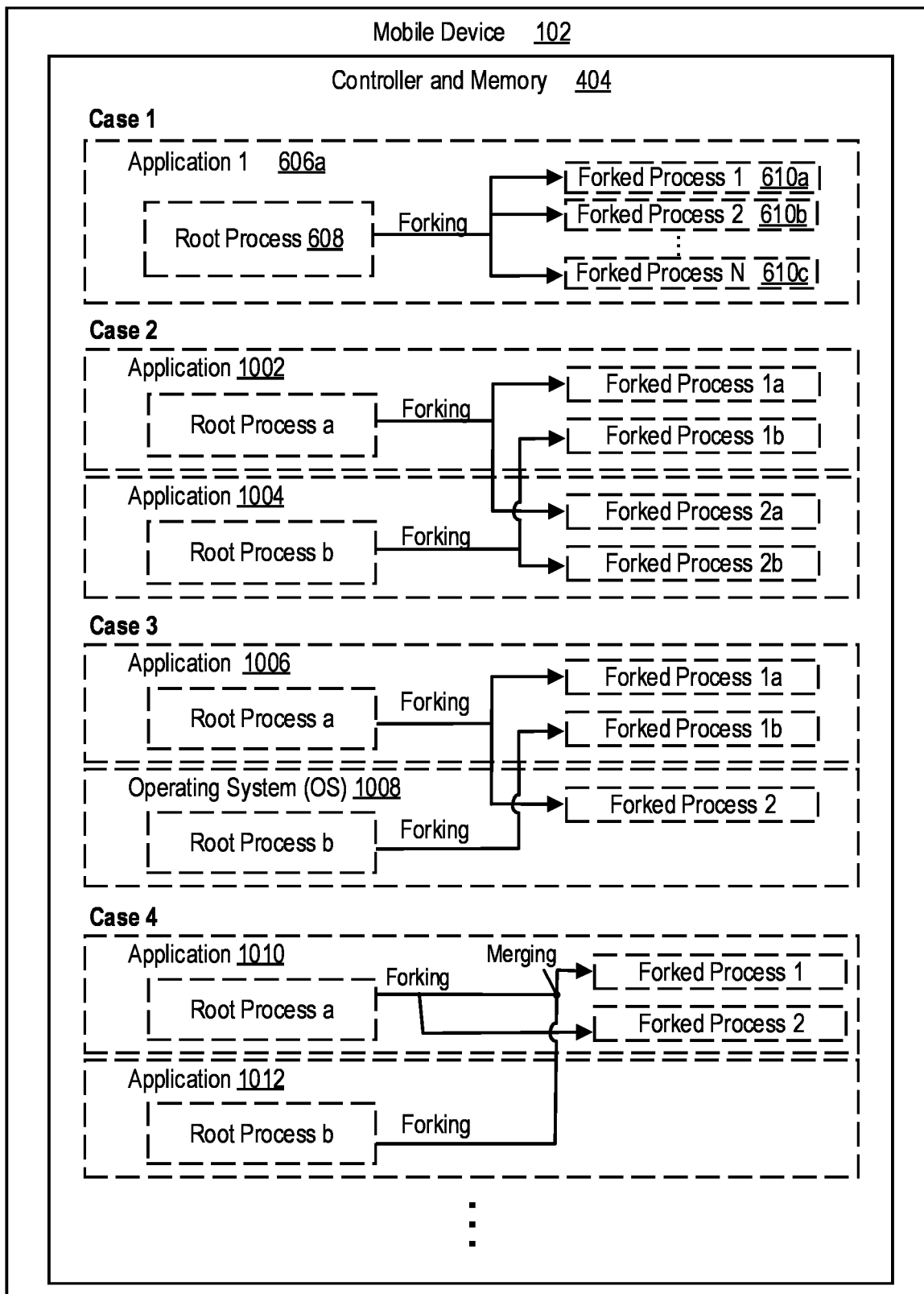
FIG. 10 illustrates the example mobile device depicted in FIGS. 1, 4, and 6 including example alternatives of root processes, in accordance with some embodiments of the present disclosure.

FIG. 10 illustrates the mobile device 102 depicted in FIGS. 1, 4, and 6 including example alternatives of root processes, in accordance with some embodiments of the present disclosure. As shown in FIG. 10, the mobile device 102 includes the controller and memory 404 and four example cases of alternatives of root processes (see example cases 1, 2, 3, and 4 shown in FIG. 10). The mobile device 102 shown in FIG. 10 can also include aspects of the mobile device 102 shown in FIGS. 1, 4, and 6.

The first example case shown in FIG. 10 is case 1. In case 1, application 606a is depicted as it is shown in FIG. 6. Application 606a includes a root process 608 that is forked into multiple forked processes (e.g., see forked processes 610a, 610b, and 610c).

The second example case shown in FIG. 10 is case 2. In case 2, application 1002 includes a root process "a" and application 1004 includes a root process "b". In case 2, different root processes are shown being used by multiple applications. This is a many-to-many mapping example, which is a superset of many-to-one mapping examples. A root process for an application can be used by two or more applications. Also, one-to-many mapping examples can be used in some embodiments described herein. For example, multiple different root processes can be used by a single application. As shown in FIG. 10, in case 2, root process "a" of application 1002 is forked into forked process 1a and 2a, and process 1a is being used by application 1002 and process 2a is being used by application 1004. Also shown, in case 2, root process "b" of application 1004 is forked into forked process 1b and 2b, and forked process 1b is being used by application 1002 and process 2b is being used by application 1004.

The third example case shown in FIG. 10 is case 3. In case 3, application 1006 includes a root process "a" and operating system 1008 (which is an OS of the mobile device 102) includes a root process "b". In case 3, the root process "a" is forked into at least forked processes 1a and 2 and the root process "b" is forked into at least forked process 1b. In case 3, the OS-generated forked process (forked process 1b) can be used by one or multiple applications (e.g., FIG. 10 shows the OS-generated forked process being used by application 1006). And, the OS 1008 can request a forked process from any application to modify and/or generate its own processes (e.g., see forked process 2 forked from root process "a" of application 1006, which is shown being used by the OS).

And, other applications besides the OS can use the forked process 2 forked from root process "a" of application 1006.

The fourth example case shown in FIG. 10 is case 4. In case 4, application 1010 includes a root process "a" and application 1012 includes a root process "b". In case 4, forked processes 1 and 2 are forked from root process "a" of application 1010, and at least forked process 1 is also forked from root process "b" of application 1012. Case 4 shows merging two forked processes from different applications into one forked process (e.g., see forked process 1). In some examples the forked processes from different applications can be different forked processes that are merged into a combined and merged forked process. In some other examples, the forked processes that are merged can include the same processes and/or data. Implementation of the merge shown in case 4 of FIG. 10 can be done via merged forking which can include a special forking process that includes merging of forked processes. The special forking process can be an OS system call. The special forking with merging can use one or more processes as input (e.g., each represented by bytecode) and merge the process(es) into one referenced process. It can use a merge schema (such as a merged schema described by an XML file). The merge schema can point to sections of bytecode and data and each section can represent a certain function call or task. The merge schema can also provide instructions for the merging of each section (e.g. substituted by relevant section in first process by one in a second process, or inserted in the first process A, etc.).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A device, comprising:
a memory comprising a first memory portion and a second memory portion;
a processor coupled to the memory, wherein the processor is configured to:
monitor, by an operating system of the device, a plurality of processes of one or more applications, wherein the plurality of processes are executed at least in part by the operating system;
determine, by the operating system, that a first object or component used by the plurality of processes is used by the one or more applications during a root process of the one or more applications and determine that a second object or component used by the plurality of processes is not used by the one or more applications during the root process;
load, by the operating system into the first memory portion during the root process of the one or more applications, at least partially, the first object or component based on the determination that the first object or component is used by the one or more applications during the root process; and
load, by the operating system into the second memory portion, at least partially, the second object or component, wherein the first memory portion is a first memory type and the second portion of the memory is a second memory type different from the first memory type,
wherein the root process is generated during booting of the operating system on the device.

2. The device of claim 1, wherein the device is a mobile device.

3. The device of claim 1, wherein the determination that the first object or component is used by the one or more applications during the root process further comprises the processor configured to determine that the first object or component is more critical than the second object or component comprising that the processor further is configured to determine a score of the first object or component and the second object or component, wherein the score is used to determine placement of the first object or component and the second object or component into the first memory portion and the second memory portion, respectively.

4. The device of claim 1, wherein the determination that the first object or component used by the one or more applications during the root process occurs during initiation of an application of the one or more applications.

5. The device of claim 1, wherein the load of the first object or component occurs during initiation of an application of the one or more applications.

6. The device of claim 1, wherein the load of the second object or component occurs during initiation of an application of the one or more applications.

7. The device of claim 1, wherein the determination that the first object or component used by the one or more applications during the root process occurs during initiation of an application of the one or more applications, and further wherein the initiation of the application comprises an execution of the root process for the application.

8. The device of claim 7, wherein the root process further comprises the load of the first object or component and the load of the second object or component.

9. The device of claim 1, wherein the first memory portion comprises dynamic random-access memory (DRAM).

10. The device of claim 9, wherein the second memory portion comprises non-volatile random-access memory (NVRAM).

11. The device of claim 10, wherein the NVRAM comprises 3D XPoint memory.

12. The device of claim 1, wherein the determination that the first object or component used by the one or more applications during the root process comprises at least one of a determination based at least partially on a pre-determined scores of particular objects or components stored in a table or based at least partially on machine learning.

13. The device of claim 1, wherein the processor is further configured to, after the first object or component is loaded and the second object or component is loaded, at least one of:
move the first object or component from the first memory portion to the second memory portion when usage decreases or is predicted to decrease beyond a first threshold for the first object or component; or
move the second object or component from the second memory portion to the first memory portion when usage increases or is predicted to increase beyond a second threshold for the second object or component.

14. A non-transitory computer-readable storage medium having non-transitory computer-executable instructions stored thereon, that upon execution by a processor associated with a computing device, are configured to cause the processor to:
monitor, by an operating system, a plurality of processes of one or more applications, wherein the plurality of processes are executed at least in part by the operating system;
determine, by the operating system, that a first object or component used by the plurality of processes is used by the one or more applications during an initiation of an application of the one or more applications and determine that a second object or component used by the plurality of processes is not used by the one or more applications during the initiation of the application;
load, by the operating system into a first memory portion of a memory device during the initiation of the application, at least partially, the first object or component based on the determination that the first object or component is used during the initiation of the application; and
load, by the operating system into a second memory portion of the memory device, at least partially, the second object or component,
wherein the root process is generated during booting of the operating system on the computing device.

15. The non-transitory computer-readable storage medium of claim 14, wherein the determination that the first object or component is used during the initiation of the application occurs during initiation of an application of the one or more applications.

16. The non-transitory computer-readable storage medium of claim 15, wherein the initiation of the application comprises an execution of a root process for the application to an initial point according to patterns of prior executions of the application.

17. The non-transitory computer-readable storage medium of claim 16, wherein the instructions further cause the processor to:
receive a request to start the application from a user of a mobile device; and
start the application in the mobile device upon receipt of the request to start the application and through use of the root process of the application.

18. The non-transitory computer-readable storage medium of claim 17, wherein the receipt of the request or the start of the application is performed in or by an operating system (OS) in the mobile device.

19. A device, comprising:
a memory comprising a first memory portion and a second memory portion;
a processor coupled to the memory, wherein the processor is configured to:
monitor, by an operating system, a plurality of processes of one or more applications;
determine, by the operating system, that a first object or component used by the plurality of processes is related to at least one of an application runtime environment or system calls of the one or more applications and that a second object or component used by the plurality of processes is not related to at least one of the application runtime environment or the system calls of the one or more applications;
load, into the first memory portion by a root process of the one or more applications, at least partially, the first object or component based on the determination that the first object or component is related to at least one of the application runtime environment or the system calls of the one or more applications; and
load, into the second memory portion, at least partially, the second object or component,
wherein the root process is generated during booting of the operating system on the device.

* * * * *